US009624992B2

(12) United States Patent
Kasuya et al.

(10) Patent No.: US 9,624,992 B2
(45) Date of Patent: Apr. 18, 2017

(54) CONTROL DEVICE FOR VEHICLE DRIVE DEVICE

(71) Applicant: AISIN AW CO., LTD., Anjo-shi, Aichi-ken (JP)

(72) Inventors: Satoru Kasuya, Nishio (JP); Masashi Kito, Anjo (JP); Shigeru Sugisaka, Nishio (JP); Yuichi Seki, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 203 days.

(21) Appl. No.: 14/356,505

(22) PCT Filed: Jan. 17, 2013

(86) PCT No.: PCT/JP2013/050829
§ 371 (c)(1),
(2) Date: May 6, 2014

(87) PCT Pub. No.: WO2013/108847
PCT Pub. Date: Jul. 25, 2013

(65) Prior Publication Data
US 2014/0288754 A1 Sep. 25, 2014

(30) Foreign Application Priority Data

Jan. 17, 2012 (JP) .................................. 2012-007022

(51) Int. Cl.
*F16D 48/06* (2006.01)
*B60K 6/48* (2007.10)
(Continued)

(52) U.S. Cl.
CPC .............. *F16D 48/066* (2013.01); *B60K 6/48* (2013.01); *B60K 6/547* (2013.01); *B60W 10/02* (2013.01);
(Continued)

(58) Field of Classification Search
CPC ...... F16D 48/066; F16D 48/08; F16D 48/062; F16D 2500/30415; F16D 2500/3144;
(Continued)

(56) References Cited

U.S. PATENT DOCUMENTS 4,200,008 A * 4/1980 Dach ..................... F16H 61/067
477/150
2011/0087394 A1 4/2011 Shimanaka
(Continued)

FOREIGN PATENT DOCUMENTS

JP   A-2000-175311   6/2000
JP   A-2006-137332   6/2006
(Continued)

OTHER PUBLICATIONS

Machine Translation of JP 2006-137332, printed Jan. 19, 2016.*
Feb. 12, 2013 International Search Report issued in International Patent Application No. PCT/JP2013/050829.

Primary Examiner — Redhwan k Mawari
Assistant Examiner — Alan D Hutchinson
(74) Attorney, Agent, or Firm — Oliff PLC

(57) ABSTRACT

A control device that controls a vehicle drive device in which a rotary electric machine is provided in a power transfer path that connects between an internal combustion engine and wheels. Engagement of a second engagement device is started when a change in shift range from a stop range to a running range is detected when output torque of the rotary electric machine is zero with the internal combustion engine rotating and with both the first engagement device and the second engagement device disengaged. Engagement of a first engagement device is started after engagement of the second engagement device is started, and the output torque of the rotary electric machine is increased from zero at the same time as engagement of the first
(Continued)

engagement device is started or before engagement of the first engagement device is started.

14 Claims, 9 Drawing Sheets

(51) Int. Cl.
*B60K 6/547* (2007.10)
*B60W 10/02* (2006.01)
*B60W 10/08* (2006.01)
*B60W 10/06* (2006.01)
*B60W 30/18* (2012.01)
*B60W 20/40* (2016.01)
*F16D 48/08* (2006.01)

(52) U.S. Cl.
CPC ............ *B60W 10/06* (2013.01); *B60W 10/08* (2013.01); *B60W 20/40* (2013.01); *B60W 30/18027* (2013.01); *F16D 48/062* (2013.01); *F16D 48/08* (2013.01); *B60K 2006/4825* (2013.01); *B60Y 2300/429* (2013.01); *F16D 2500/1066* (2013.01); *F16D 2500/3067* (2013.01); *F16D 2500/30415* (2013.01); *F16D 2500/30426* (2013.01); *F16D 2500/3144* (2013.01); *F16D 2500/31466* (2013.01); *F16D 2500/50296* (2013.01); *F16D 2500/5106* (2013.01); *F16D 2500/70458* (2013.01); *Y02T 10/6221* (2013.01); *Y02T 10/6252* (2013.01); *Y02T 10/6286* (2013.01); *Y02T 10/7258* (2013.01); *Y10S 903/946* (2013.01)

(58) Field of Classification Search
CPC ... F16D 2500/70458; F16D 2500/3067; F16D 2500/1066; B60W 20/40; B60W 10/06; B60W 30/18027; B60W 10/02; B60W 10/08; B60K 6/48; B60K 6/547
See application file for complete search history.

(56) References Cited

U.S. PATENT DOCUMENTS

2012/0290158 A1\* 11/2012 Yoshikawa .............. B60K 6/48
701/22
2013/0297127 A1\* 11/2013 Takamura ................ B60K 6/48
701/22

FOREIGN PATENT DOCUMENTS

| JP | A-2009-262749 | 11/2009 |
| JP | A-2010-155590 | 7/2010 |
| JP | A-2010-196868 | 9/2010 |
| JP | A-2011-079478 | 4/2011 |
| JP | 2011-126318 A | 6/2011 |

\* cited by examiner

CONTROL DEVICE FOR VEHICLE DRIVE DEVICE

TECHNICAL FIELD

The present invention relates to a control device that controls a vehicle drive device in which a rotary electric machine is provided in a power transfer path that connects between an internal combustion engine and wheels and in which a first engagement device is provided between the internal combustion engine and the rotary electric machine and a second engagement device is provided between the rotary electric machine and the wheels.

BACKGROUND ART

A technology described in Patent Document 1 mentioned below, for example, is already known as the control device described above. In the technology described in Patent Document 1, when starting a vehicle using drive forces of both an internal combustion engine and a rotary electric machine, a first engagement device is engaged first to start the internal combustion engine using the drive force of the rotary electric machine, and thereafter a second engagement device is engaged to start the vehicle.

In the technology according to Patent Document 1, in which the second engagement device is engaged after the first engagement device is engaged to rotate the internal combustion engine and the rotary electric machine, a reduction in working oil due to simultaneous engagement of the two engagement devices can be effectively prevented. However, there is a difference in rotational speed between engagement members of the second engagement device when the second engagement device is engaged. Hence, in the technology according to Patent Document 1, the second engagement device is controlled to a slipping engagement state until the rotational speed difference across the second engagement device becomes zero with the vehicle speed increased. Therefore, the durability of the second engagement device may be reduced because of heat generated by dynamic friction.

In the technology according to Patent Document 1, in which the second engagement device is engaged after the first engagement device is engaged to start the internal combustion engine, the timing when the second engagement device is engaged so that drive forces of drive force sources can be transferred to wheels is delayed by an amount corresponding to the time required to engage the first engagement device and start the internal combustion engine, which delays a response to a request to start the vehicle.

In addition, the technology according to Patent Document 1 relates to control for the two engagement devices at the start with rotation of the internal combustion engine stopped, and Patent Document 1 does not specifically describe or support control for the two engagement devices at the start with the internal combustion engine rotating.

RELATED-ART DOCUMENTS

Patent Documents

Patent Document 1: Japanese Patent Application Publication No. 2010-155590 (JP 2010-155590 A)

SUMMARY OF THE INVENTION

Problem to be Solved by the Invention

Thus, it is desirable to provide a control device for a vehicle drive device capable of starting a vehicle responsively in response to a request to start the vehicle and suppressing a reduction in durability of a second engagement device due to heat while securing working oil for both a first engagement device and the second engagement device in the case where the request to start the vehicle is provided with an internal combustion engine rotating and with both the first engagement device and the second engagement device disengaged.

Means for Solving the Problem

The present invention provides a control device that controls a vehicle drive device in which a rotary electric machine is provided in a power transfer path that connects between an internal combustion engine and wheels and in which a first engagement device is provided between the internal combustion engine and the rotary electric machine and a second engagement device is provided between the rotary electric machine and the wheels, characterized in that engagement of the second engagement device is started in the case where a change in shift range from a stop range to a running range is detected when output torque of the rotary electric machine is zero with the internal combustion engine rotating and with both the first engagement device and the second engagement device disengaged, engagement of the first engagement device is started after engagement of the second engagement device is started, and the output torque of the rotary electric machine is increased from zero at the same time as engagement of the first engagement device is started or before engagement of the first engagement device is started.

The term "rotary electric machine" as used herein refers to any of a motor (electric motor), a generator (electric generator), and a motor generator that functions both as a motor and as a generator as necessary.

The term "drivably coupled" as used herein refers to a state in which two rotary elements are coupled to each other so as to enable transfer of a drive force, which includes a state in which the two rotary elements are coupled to each other so as to rotate together with each other, and a state in which the two rotary elements are coupled to each other via one or two or more transmission members so as to enable transfer of a drive force. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device.

According to the characteristic configuration described above, engagement of the second engagement device is started in the case where a change in shift range from the stop range to the running range is detected. Thus, the drive force of the rotary electric machine can be transferred to the wheels after a request to start the vehicle is provided. In addition, the output torque of the rotary electric machine is increased from zero at the same time as engagement of the first engagement device is started or before engagement of the first engagement device is started. Thus, the vehicle can be started responsively in response to a request to start the vehicle with the output torque of the rotary electric machine transferred to the wheels side before the first engagement device is engaged so that the output torque of the engine can be transferred to the wheels side.

If it is attempted to engage the first engagement device and the second engagement device at the same time unlike the characteristic configuration described above, the amount of working oil that needs to be supplied to the first engagement device and the second engagement device is increased, which may make the amount of supply of working oil shorter than the necessary amount. In particular, in the case where a stop range is selected with the internal combustion engine rotating and with both the first engagement device and the second engagement device disengaged, the vehicle drive device excluding the internal combustion engine is normally not rotating. In this state, a hydraulic pressure may not be generated by driving a hydraulic pump using the rotational drive force of the vehicle drive device excluding the internal combustion engine, which makes the amount of supply of working oil short to cause a reduction in hydraulic pressure.

According to the characteristic configuration described above, engagement of the first engagement device is started after engagement of the second engagement device is started. Thus, the second engagement device is engaged first, and thereafter the first engagement device is engaged. If engagement of the second engagement device is started earlier than that of the first engagement device as in the characteristic configuration described above, it is possible to shorten the time taken until the second engagement device is engaged with a shortage of the amount of supply of working oil alleviated compared to a case where engagement of the two engagement devices is started at the same time. Hence, in the case where engagement of the second engagement device is started earlier as in the characteristic configuration described above, it is possible to shorten the period before the vehicle can be started after a change in shift range is detected compared to a case where engagement of the two engagement devices is started at the same time.

Engagement of the first engagement device may be started after a transfer torque capacity of the second engagement device starts increasing because of the start of engagement of the second engagement device, and the output torque of the rotary electric machine may be increased from zero after the transfer torque capacity of the second engagement device starts increasing.

When the transfer torque capacity of the second engagement device starts increasing, the amount of working oil to be supplied to the second engagement device is decreased. Hence, a shortage of the amount of supply of working oil can also be suppressed if engagement of the first engagement device is started after the transfer torque capacity of the second engagement device starts increasing as in the configuration described above. Therefore, the transfer torque capacity of the second engagement device can also be increased smoothly after engagement of the first engagement device is started.

When the transfer torque capacity of the second engagement device starts increasing, the output torque of the rotary electric machine can be transferred to the wheels side. Hence, the output torque of the rotary electric machine can be transferred to the wheels side if the output torque of the rotary electric machine is increased from zero after the transfer torque capacity of the second engagement device starts increasing as in the configuration described above. When the transfer torque capacity of the second engagement device starts increasing, in addition, an increase in rotational speed difference across the second engagement device can be suppressed even if the output torque of the rotary electric machine is increased, which facilitates transition of the second engagement device to the direct engagement state.

Engagement of the first engagement device may be started and the output torque of the rotary electric machine may be increased from zero to cause the rotary electric machine to output torque matching rotary electric machine required torque, which is torque required for the rotary electric machine to start a vehicle, after a transfer torque capacity of the second engagement device becomes larger than a transfer torque capacity with which the rotary electric machine required torque can be transferred because of the start of engagement of the second engagement device.

According to the configuration, control in which the rotary electric machine is caused to output torque matching the rotary electric machine required torque, which is torque required for the rotary electric machine to start the vehicle, after the transfer torque capacity of the second engagement device becomes larger than a transfer torque capacity with which the rotary electric machine required torque can be transferred. Thus, the output torque of the rotary electric machine output in accordance with the rotary electric machine required torque can be transferred to the wheels while maintaining the second engagement device in the direct engagement state rather than the second engagement device is brought into the slipping engagement state with a difference in rotational speed between the engagement members of the second engagement device caused by the output torque of the rotary electric machine. Hence, it is possible to prevent a reduction in durability of the second engagement device due to heat generated by dynamic friction with the second engagement device brought into the slipping engagement state, and to start the vehicle by accurately transferring torque matching the rotary electric machine required torque to the wheels. In addition, the vehicle can be started responsively in response to a request to start the vehicle.

According to the configuration described above, in addition, engagement of the first engagement device is started after the transfer torque capacity of the second engagement device becomes larger than a predetermined transfer torque capacity. Thus, the second engagement device is reliably engaged first, and thereafter the first engagement device is engaged. If the second engagement device is engaged earlier than the first engagement device in this way, it is possible to reliably shorten the time taken until the second engagement device is engaged with a shortage of the amount of supply of working oil reliably alleviated compared to a case where the two engagement devices are engaged at the same time. If the transfer torque capacity of the second engagement device becomes larger than the predetermined transfer torque capacity, in addition, the output torque of the rotary electric machine matching the rotary electric machine required torque can be transferred to the wheels as described above, and thus the vehicle can be started using the drive force of the rotary electric machine. Hence, in the case where the second engagement device is engaged earlier as in the configuration described above, it is possible to reliably shorten the period before the vehicle can be started after a change in shift range is detected compared to a case where the two engagement devices are engaged at the same time.

A hydraulic pressure supply source for the first engagement device and a hydraulic pressure supply source for the second engagement device may be common to each other.

In the configuration, if it is attempted to engage the first engagement device and the second engagement device at the same time, the amount of working oil that needs to be supplied from the common hydraulic pressure supply sources to the first engagement device and the second engagement device is increased, which is highly likely to make the amount of supply of working oil short. Thus, the technology according to the present invention in which the respective timings to engage the first engagement device and the second engagement device are made different from each other is particularly suitable for such a configuration.

Engagement of the first engagement device or the second engagement device may be started by starting to move a hydraulic piston provided in each engagement device to an engagement side.

In the configuration, the amount of working oil to be supplied to each engagement device becomes larger in order to move the hydraulic piston to the engagement side after engagement of each engagement device is started. Therefore, if engagement of the first engagement device and the second engagement device is started at the same time, the amount of working oil that needs to be supplied to the first engagement device and the second engagement device is increased, which is highly likely to make the amount of supply of working oil short. Thus, the technology according to the present invention in which the respective timings to engage the first engagement device and the second engagement device are made different from each other is particularly suitable for such a configuration.

The second engagement device may be controlled such that the second engagement device is brought into a slipping engagement state when the first engagement device transitions to a direct engagement state after engagement of the first engagement device is started.

According to the configuration, the second engagement device is controlled to the slipping engagement state when the first engagement device transitions from the slipping engagement state to the direct engagement state. Thus, it is possible to prevent a torque shock caused when the first engagement device transitions to the direct engagement state from being transferred to the wheels via the second engagement device.

The control device for a vehicle drive device may further include a first hydraulic pump driven by rotation of the rotary electric machine, and a second hydraulic pump driven by a pump-driving drive force source that is independent of the rotary electric machine; the first hydraulic pump and the second hydraulic pump may be hydraulic pressure supply sources that are common to the first engagement device and the second engagement device; and the pump-driving drive force source may be driven to engage at least the second engagement device using a hydraulic pressure from the second hydraulic pump at least while rotation of the rotary electric machine is stopped.

While rotation of the rotary electric machine is stopped, the first hydraulic pump driven by rotation of the rotary electric machine is unable to generate a hydraulic pressure. In this case, according to the configuration described above, the pump-driving drive force source may be driven to drive the second hydraulic pump to generate a hydraulic pressure. Thus, the vehicle can be started using the drive force of the rotary electric machine by engaging at least the second engagement device.

MODES FOR CARRYING OUT THE INVENTION

Figure 1:
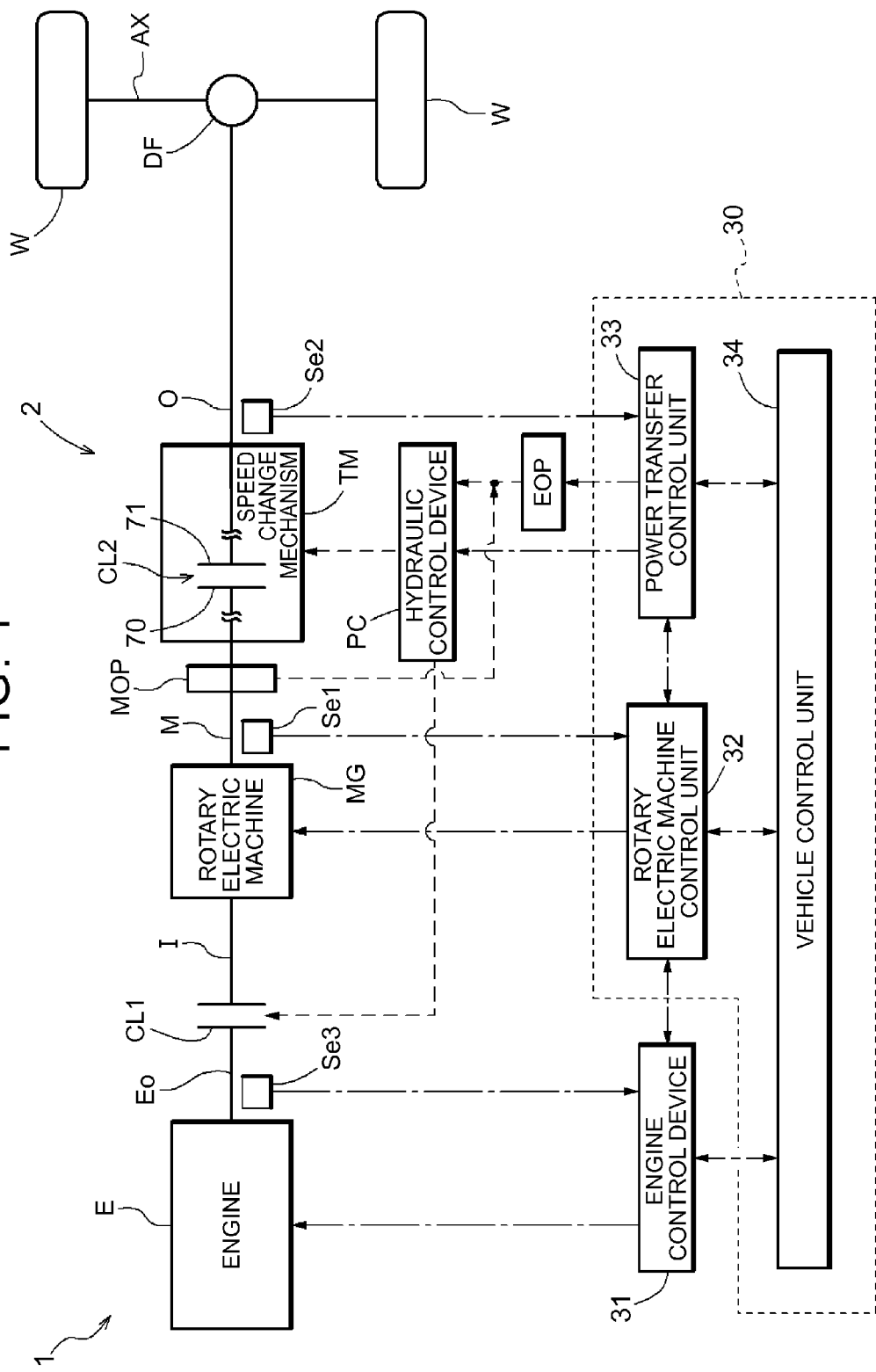
FIG. 1 is a schematic diagram illustrating a schematic configuration of a vehicle drive device and a control device according to an embodiment of the present invention.

A control device 30 according to an embodiment of the present invention will be described with reference to the drawings. FIG. 1 is a schematic diagram illustrating a schematic configuration of a vehicle drive device 1 and the control device 30 according to the embodiment. In the drawing, the solid lines each indicate a drive force transfer path, the broken lines each indicate a working oil supply path, and the dash-dotted lines each indicate a signal transfer path. As illustrated in the drawing, the vehicle drive device 1 according to the embodiment is generally configured to include an engine E and a rotary electric machine MG each serving as a drive force source, and to transfer a drive force of the drive force source to wheels W via a power transfer mechanism. In the vehicle drive device 1, the rotary electric machine MG is provided in a power transfer path that connects between the engine E and the wheels W, a first engagement device CL1 is provided between the engine E and the rotary electric machine MG, and a second engagement device CL2 is provided between the rotary electric machine MG and the wheels W. Here, the first engagement device CL1 selectively couples and decouples the engine E and the rotary electric machine MG to and from each other in accordance with the engagement state of the first engagement device CL1. The second engagement device CL2 selectively couples and decouples the rotary electric machine MG and the wheels W to and from each other in accordance with the engagement state of the second engagement device CL2. In the vehicle drive device 1 according to the embodiment, a speed change mechanism TM is provided in a portion of the power transfer path between the rotary electric machine MG and the wheels W. The second engagement device CL2 is one of a plurality of engagement devices provided in the speed change mechanism TM.

A hybrid vehicle includes the control device 30 which controls the vehicle drive device 1. The control device 30 according to the embodiment includes a rotary electric machine control unit 32 that controls the rotary electric machine MG, a power transfer control unit 33 that controls the speed change mechanism TM, the first engagement device CL1, and the second engagement device CL2, and a vehicle control unit 34 that integrates these control devices to control the vehicle drive device 1. The hybrid vehicle also includes an engine control device 31 that controls the engine E.

Figure 2:
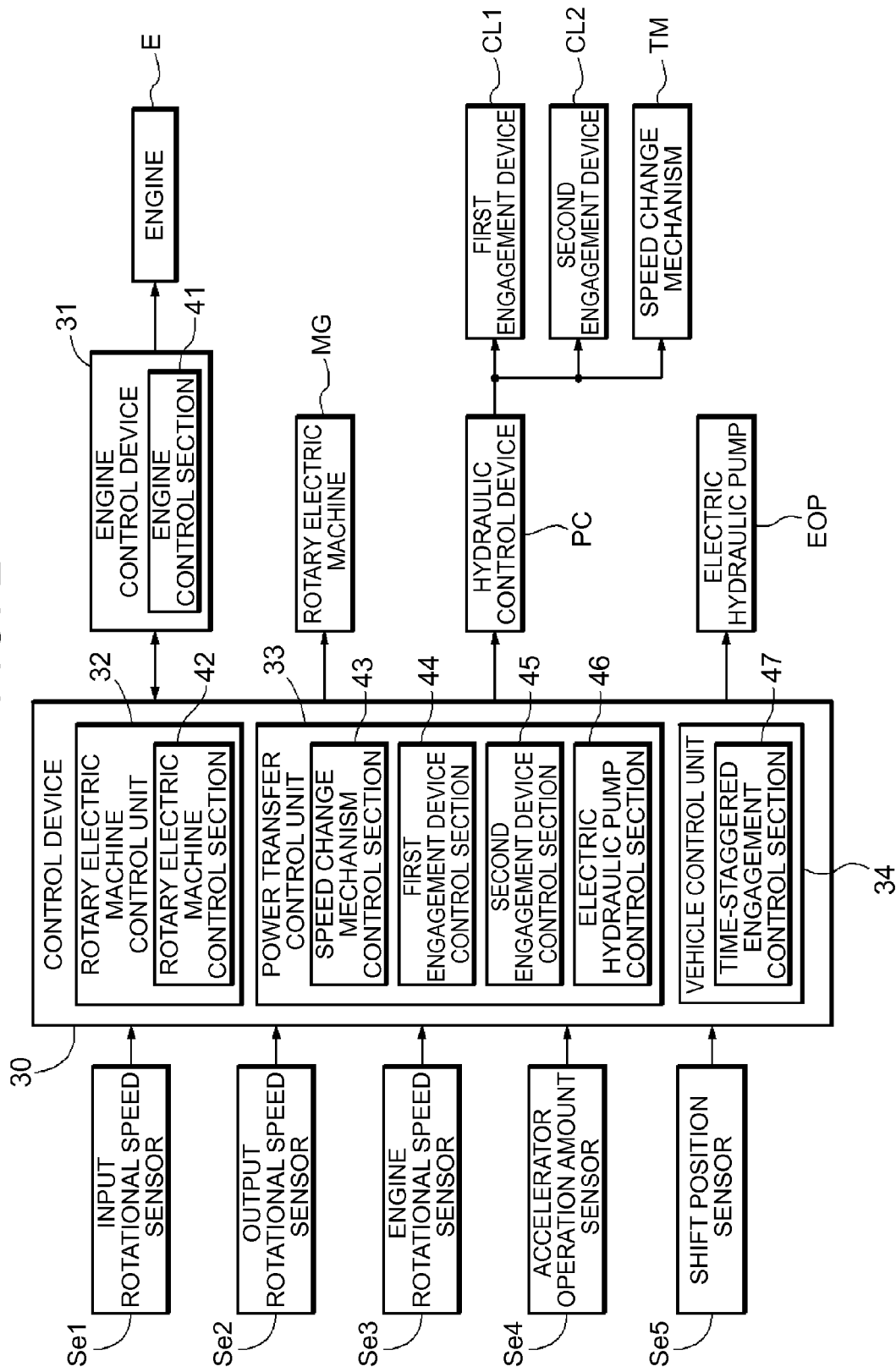
FIG. 2 is a block diagram illustrating a schematic configuration of the control device according to the embodiment of the present invention.

As illustrated in FIG. 2, the control device 30 includes a time-staggered engagement control section 47. The time-staggered engagement control section 47 is characterized in performing time-staggered engagement control in which engagement of the first engagement device CL1 is started after engagement of the second engagement device CL2 is started in the case where a change in shift range from a stop range to a running range is detected (control start conditions are met) with the engine E rotating and with both the first engagement device CL1 and the second engagement device CL2 disengaged, and in which output torque of the rotary electric machine MG is increased from zero at the same time as engagement of the first engagement device CL1 is started or before engagement of the first engagement device CL1 is started.

The vehicle drive device 1 and the control device 30 according to the embodiment will be described in detail below.

1. Configuration of Vehicle Drive Device 1

First, the configuration of the vehicle drive device 1 of the hybrid vehicle according to the embodiment will be described. As illustrated in FIG. 1, the hybrid vehicle is a parallel-type hybrid vehicle which includes the engine E and the rotary electric machine MG each serving as a drive force source for the vehicle and in which the engine E and the rotary electric machine MG are drivably coupled to each other in series. The hybrid vehicle includes the speed change mechanism TM, which transfers rotation of the engine E and the rotary electric machine MG transmitted to an intermediate shaft M to an output shaft O with the rotational speed changed and with torque converted.

The engine E is an internal combustion engine driven by combustion of fuel. Various engines known in the art such as a gasoline engine and a diesel engine, for example, may be used as the engine E. In the example, an engine output shaft Eo such as a crankshaft of the engine E is selectively drivably coupled via the first engagement device CL1 to the input shaft I drivably coupled to the rotary electric machine MG. That is, the engine E is selectively drivably coupled to the rotary electric machine MG via the first engagement device CL1 which is a friction engagement element. The engine output shaft Eo is provided with a damper to be able to transfer rotation to the side of the wheels W with fluctuations in output torque and rotational speed due to intermittent combustion of the engine E damped.

The rotary electric machine MG includes a stator that is stationary with respect to a non-rotary member and a rotor rotatably supported at a radially inner position corresponding to the stator. The rotor of the rotary electric machine MG is drivably coupled to the input shaft I and the intermediate shaft M so as to rotate together with the input shaft I and the intermediate shaft M. That is, in the embodiment, both the engine E and the rotary electric machine MG are drivably coupled to the input shaft I and the intermediate shaft M. The rotary electric machine MG is electrically connected to a battery serving as an electricity accumulation device via an inverter that performs a DC/AC conversion. The rotary electric machine MG can function as a motor (electric motor) that is supplied with electric power to produce power and as a generator (electric generator) that is supplied with power to generate electric power. That is, the rotary electric machine MG performs power running using electric power supplied from the battery via the inverter, or generates electric power using a rotational drive force transferred from the engine E or the wheels W. The generated electric power is accumulated in the battery via the inverter.

The speed change mechanism TM is drivably coupled to the intermediate shaft M, to which the drive force source is drivably coupled. In the embodiment, the speed change mechanism TM is a stepped automatic transmission that provides a plurality of shift speeds with different speed ratios. In order to establish the plurality of shift speeds, the speed change mechanism TM includes a gear mechanism such as a planetary gear mechanism and a plurality of engagement devices. In the embodiment, one of the plurality of engagement devices is the second engagement device CL2. The speed change mechanism TM transfers rotation of the intermediate shaft M to the output shaft O with the rotational speed changed with the speed ratio of each shift speed and with torque converted. The torque transferred from the speed change mechanism TM to the output shaft O is distributed and transferred to two, left and right, axles AX via an output differential gear device DF to be transferred to the wheels W drivably coupled to the axles AX. Here, the term "speed ratio" refers to the ratio of the rotational speed of the intermediate shaft M to the rotational speed of the output shaft O for a case where each shift speed is established in the speed change mechanism TM. In the present invention, the speed ratio has a value obtained by dividing the rotational speed of the intermediate shaft M by the rotational speed of the output shaft O. That is, the rotational speed of the output shaft O is obtained by dividing the rotational speed of the intermediate shaft M by the speed ratio. In addition, torque transferred from the speed change mechanism TM to the output shaft O is obtained by multiplying torque transferred from the intermediate shaft M to the speed change mechanism TM by the speed ratio.

In the example, the plurality of engagement devices (including the second engagement device CL2) of the speed change mechanism TM and the first engagement device CL1 are each a friction engagement element such as a clutch and a brake formed to include friction members. Each of the friction engagement elements can be continuously controlled such that the transfer torque capacity of the friction engagement element is increased and decreased by controlling the engagement pressure of the friction engagement element by controlling the supplied hydraulic pressure. A wet multi-plate clutch or a wet multi-plate brake, for example, may be suitably used as the friction engagement elements.

A friction engagement element transfers torque between the engagement members of the friction engagement element through friction between the engagement members. In the case where there is a difference in rotational speed (slipping) between the engagement members of the friction engagement element, torque (slip torque) corresponding to the magnitude of the transfer torque capacity is transferred from a member with a higher rotational speed to a member with a lower rotational speed through dynamic friction. In the case where there is no difference in rotational speed (slipping) between the engagement members of the friction engagement element, torque up to the magnitude of the transfer torque capacity is transferred between the engagement members of the friction engagement element through static friction. Here, the term "transfer torque capacity" refers to the magnitude of maximum torque that can be transferred by a friction engagement element through friction. The magnitude of the transfer torque capacity is varied in proportion to the engagement pressure of the friction engagement element. The term "engagement pressure" refers to a pressure that presses an input-side engagement member (friction plate) and an output-side engagement member (friction plate) against each other. In the embodiment, the engagement pressure is varied in proportion to the magnitude of the supplied hydraulic pressure. That is, in the embodiment, the magnitude of the transfer torque capacity is varied in proportion to the magnitude of the hydraulic pressure supplied to the friction engagement element.

Each of the friction engagement elements includes a return spring, and is urged to be disengaged by the reaction force of the spring. When a force produced by the hydraulic pressure supplied to a hydraulic cylinder of the friction engagement element exceeds the reaction force of the spring, the friction engagement element starts producing a transfer torque capacity to bring the friction engagement element from the disengaged state into the engaged state. The hydraulic pressure at which the transfer torque capacity starts being produced is referred to as a "stroke end pressure". Each of the friction engagement elements is configured such that the transfer torque capacity of the friction engagement element is increased in proportion to an increase in supplied hydraulic pressure after the hydraulic pressure exceeds the stroke end pressure.

In the embodiment, the term "engaged state" refers to a state in which a friction engagement element is producing a transfer torque capacity. The engaged state includes a slipping engagement state and a direct engagement state. The term "disengaged state" refers to a state in which a friction engagement element is not producing a transfer torque capacity. The term "slipping engagement state" refers to an engagement state in which there is a difference in rotational speed (slipping) between the engagement members of a friction engagement element. The term "direct engagement state" refers to an engagement state in which there is no difference in rotational speed (slipping) between the engagement members of a friction engagement element. The term "non-direct engagement state" refers to an engagement state other than the direct engagement state, and includes the disengaged state and the slipping engagement state.

In the friction engagement elements, a transfer torque capacity is occasionally produced by dragging between the engagement members (friction members) even in the case where the control device 30 is not providing a command to produce a transfer torque capacity. For example, a transfer torque capacity is occasionally produced by dragging between the friction members which contact each other even in the case where the friction members are pressed against each other by the piston. Thus, the term "disengaged state" also includes a state in which a transfer torque capacity is produced by dragging between the friction members in the case where the control device 30 is not providing a friction engagement device with a command to produce a transfer torque capacity.

2. Configuration of Hydraulic Control System

The vehicle drive device 1 includes, as hydraulic pressure sources for a hydraulic control system, a mechanical hydraulic pump MOP driven by rotation of the rotary electric machine MG and an electric hydraulic pump EOP driven by a pump-driving drive force source (in the embodiment, a pump electric motor) that is independent of the rotary electric machine MG. The mechanical hydraulic pump MOP corresponds to the "first hydraulic pump" according to the present invention, and the electric hydraulic pump EOP corresponds to the "second hydraulic pump" according to the present invention.

A drive shaft of the mechanical hydraulic pump MOP is coupled so as to rotate together with a rotor shaft of the rotary electric machine MG. In the embodiment, the drive shaft of the mechanical hydraulic pump MOP is coupled so as to rotate together with the intermediate shaft M which rotates together with the rotor shaft of the rotary electric machine MG.

The pump electric motor is a rotary electric machine that functions as a motor (an electric motor). The pump electric motor is electrically connected to a low-voltage battery, and generates a drive force using electric power supplied from the low-voltage battery. The pump electric motor is a pump that assists the mechanical hydraulic pump MOP, and operates when the rotational speed of the rotary electric machine MG is low and a necessary amount of oil is not supplied from the mechanical hydraulic pump MOP such as while the vehicle is stopped or running at a low speed.

In addition, the hydraulic control system includes a hydraulic control device PC that adjusts the hydraulic pressure of working oil supplied from the mechanical hydraulic pump MOP and the electric hydraulic pump EOP to a predetermined pressure. Although not described in detail here, the hydraulic control device PC adjusts the operation amount of one or two or more adjustment valves on the basis of a signal pressure from a linear solenoid valve for hydraulic pressure adjustment to adjust the amount of the working oil to be drained from the adjustment valves, thereby adjusting the hydraulic pressure of the working oil to one or two or more predetermined pressures. After being adjusted to the predetermined pressure, the working oil is supplied to each of the friction engagement elements such as those of the speed change mechanism TM and the first engagement device CL1 and the second engagement device CL2 at a hydraulic pressure required by the friction engagement element.

As described above, the mechanical hydraulic pump MOP and the electric hydraulic pump EOP are hydraulic pressure supply sources that are common to the first engagement device CL1 and the second engagement device CL2. That is, the hydraulic pressure supply source for the first engagement device CL1 and the hydraulic pressure supply source for the second engagement device CL2 are common to each other. In the embodiment, as illustrated in FIG. 1, working oil discharged from the mechanical hydraulic pump MOP and working oil discharged from the electric hydraulic pump EOP are merged with each other, and thereafter supplied to the hydraulic control device PC to be adjusted.

3. Configuration of Control Device

Next, the configuration of the control device 30 which controls the vehicle drive device 1 and the engine control device 31 will be described with reference to FIG. 2.

The control units 32 to 34 of the control device 30 and the engine control device 31 each include an arithmetic processing unit such as a CPU serving as a core member, a storage device such as a RAM (random access memory) configured to read and write data from and into the arithmetic processing unit and a ROM (read only memory) configured to read data from the arithmetic processing unit, and so forth. Functional sections 41 to 47 of the control device 30 etc. are formed by software (a program) stored in the ROM of the control device or the like, hardware such as a separately provided arithmetic circuit, or a combination of both. The control units 32 to 34 of the control device 30 and the engine control device 31 are configured to communicate with each other, and perform cooperative control while sharing various information such as information detected by sensors and control parameters, thereby implementing the functions of the functional sections 41 to 47.

The vehicle drive device 1 includes sensors Se1 to Se5 that each output an electrical signal to be input to the control device 30 and the engine control device 31. The control device 30 and the engine control device 31 calculate information detected by the sensors on the basis of the input electrical signal.

An input rotational speed sensor Se1 is a sensor that detects the rotational speed of the input shaft I and the intermediate shaft M. The rotor of the rotary electric machine MG is integrally drivably coupled to the input shaft I and the intermediate shaft M. Thus, the rotary electric machine control unit 32 detects the rotational speed (angular speed) of the rotary electric machine MG and the rotational speed of the input shaft I and the intermediate shaft M on the basis of a signal input from the input rotational speed sensor Se1. An output rotational speed sensor Se2 is a sensor that detects the rotational speed of the output shaft O. The power transfer control unit 33 detects the rotational speed (angular speed) of the output shaft O on the basis of a signal input from the output rotational speed sensor Se2. The rotational speed of the output shaft O is proportional to the vehicle speed. Therefore, the power transfer control unit 33 calculates the vehicle speed on the basis of the signal input from the output rotational speed sensor Se2. An engine rotational speed sensor Se3 is a sensor that detects the rotational speed of the engine output shaft Eo (engine E). The engine control device 31 detects the rotational speed (angular speed) of the engine E on the basis of a signal input from the engine rotational speed sensor Se3.

An accelerator operation amount sensor Se4 is a sensor that detects the amount of operation of an accelerator pedal operated by a driver to detect the accelerator operation amount. The control device 30 detects the acceleration operation amount on the basis of a signal input from the acceleration operation amount sensor Se4.

A shift position sensor Se5 is a sensor that detects the selected position (shift position) of a shift lever. The control device 30 detects which of ranges such as a "drive range D", a "neutral range N", a "reverse drive range", and a "parking range" is designated by the driver on the basis of information input from the shift position sensor Se5.

3-1. Engine Control Device 31

The engine control device 31 includes an engine control section 41 that controls an operation of the engine E. In the embodiment, in the case where a command for engine required torque is provided from the vehicle control unit 34, the engine control section 41 performs torque control in which an output torque command value is set to the engine required torque according to the command provided from the vehicle control unit 34, and in which the engine E is controlled so as to output torque corresponding to the output torque command value. In the case where there is an engine combustion start request, the engine control device 31 determines that a command is provided to start combustion of the engine E, and performs control so as to start combustion of the engine E by starting to supply fuel to the engine E and ignite the fuel.

3-2. Power Transfer Control Unit 33

The power transfer control unit 33 includes a speed change mechanism control section 43 that controls the speed change mechanism TM, a first engagement device control section 44 that controls the first engagement device CL1, a second engagement device control section 45 that controls the second engagement device CL2 during starting control for the engine E, and an electric hydraulic pump control section 46 that controls the pump electric motor for the electric hydraulic pump EOP.

3-2-1. Speed Change Mechanism Control Section 43

The speed change mechanism control section 43 controls establishment of a shift speed in the speed change mechanism TM. The speed change mechanism control section 43 decides a target shift speed for the speed change mechanism TM on the basis of information detected by the sensors such as the vehicle speed, the accelerator operation amount, and the shift position. Then, the speed change mechanism control section 43 controls the hydraulic pressure to be supplied to the plurality of engagement devices provided in the speed change mechanism TM via the hydraulic control device PC to engage or disengage the engagement devices in order to establish the target shift speed in the speed change mechanism TM. Specifically, the speed change mechanism control section 43 provides the hydraulic control device PC with a command for a target hydraulic pressure (command pressure) for the engagement devices, and the hydraulic control device PC supplies the engagement devices with a hydraulic pressure at the target hydraulic pressure (command pressure) according to the command.

3-2-2. First Engagement Device Control Section 44

The first engagement device control section 44 controls the engagement state of the first engagement device CL1. In the embodiment, the first engagement device control section 44 controls the hydraulic pressure to be supplied to the first engagement device CL1 via the hydraulic control device PC such that the transfer torque capacity of the first engagement device CL1 matches a first target torque capacity according to the command provided from the vehicle control unit 34. Specifically, the first engagement device control section 44 provides the hydraulic control device PC with a command for a target hydraulic pressure (command pressure) set on the basis of the first target torque capacity, and the hydraulic control device PC supplies the first engagement device CL1 with a hydraulic pressure at the target hydraulic pressure (command pressure) according to the command.

3-2-3. Second Engagement Device Control Section 45

The second engagement device control section 45 controls the engagement state of the second engagement device CL2 during starting control for the engine E. In the embodiment, the second engagement device control section 45 controls the hydraulic pressure to be supplied to the second engagement device CL2 via the hydraulic control device PC such that the transfer torque capacity of the second engagement device CL2 matches a second target torque capacity according to the command provided from the vehicle control unit 34. Specifically, the second engagement device control section 45 provides the hydraulic control device PC with a command for a target hydraulic pressure (command pressure) set on the basis of the second target torque capacity, and the hydraulic control device PC supplies the second engagement device CL2 with a hydraulic pressure at the target hydraulic pressure (command pressure) according to the command.

In the embodiment, the second engagement device CL2 is one of a plurality of engagement devices or a singular engagement device establishing a shift speed in the speed change mechanism TM. The engagement device of the speed change mechanism TM to be used as the second engagement device CL2 may be changed in accordance with the shift speed being established, or the same engagement device may be used as the second engagement device CL2.

3-2-4. Electric Hydraulic Pump Control Section 46

The electric hydraulic pump control section 46 controls the drive state of the pump electric motor. In the embodiment, the electric hydraulic pump control section 46 is configured to perform control so as to turn on and off the pump electric motor into a driving state and a non-driving state.

3-3. Rotary Electric Machine Control Unit 32

The rotary electric machine control unit 32 includes a rotary electric machine control section 42 that controls an operation of the rotary electric machine MG. In the embodiment, in the case where a command for rotary electric machine required torque is provided from the vehicle control unit 34, the rotary electric machine control section 42 sets an output torque command value to the rotary electric machine required torque according to the command provided from the vehicle control unit 34, and controls the rotary electric machine MG so as to output torque at the output torque command value. Specifically, the rotary electric machine control section 42 performs control so as to turn on and off a plurality of switching elements included in the inverter to control the output torque of the rotary electric machine MG.

3-4. Vehicle Control Unit 34

The vehicle control unit 34 includes functional sections that control integration of various torque control performed on the engine E, the rotary electric machine MG, the speed change mechanism TM, the first engagement device CL1, the second engagement device CL2, and so forth, engagement control for the engagement devices, and so forth over the entire vehicle.

The vehicle control unit 34 calculates vehicle required torque, which is torque required to drive the wheels W and which is a target drive force to be transferred from the intermediate shaft M side to the output shaft O side in accordance with the accelerator operation amount, the vehicle speed, the charge amount of the battery, and so forth, and decides the drive mode of the engine E and the rotary electric machine MG. The vehicle control unit 34 is a functional section that calculates the engine required torque, which is output torque required for the engine E, the rotary electric machine required torque, which is output torque required for the rotary electric machine MG, the first target torque capacity, which is a transfer torque capacity required for the first engagement device CL1, and the second target torque capacity, which is a transfer torque capacity required for the second engagement device CL2, to provide the calculated values to the other control units 32 and 33 and the engine control device 31 for integration control.

In the embodiment, the vehicle control unit 34 includes the time-staggered engagement control section 47 which performs time-staggered engagement control.

The time-staggered engagement control section 47 will be described in detail below.

3-4-1. Time-staggered Engagement Control Section 47

Figure 3:
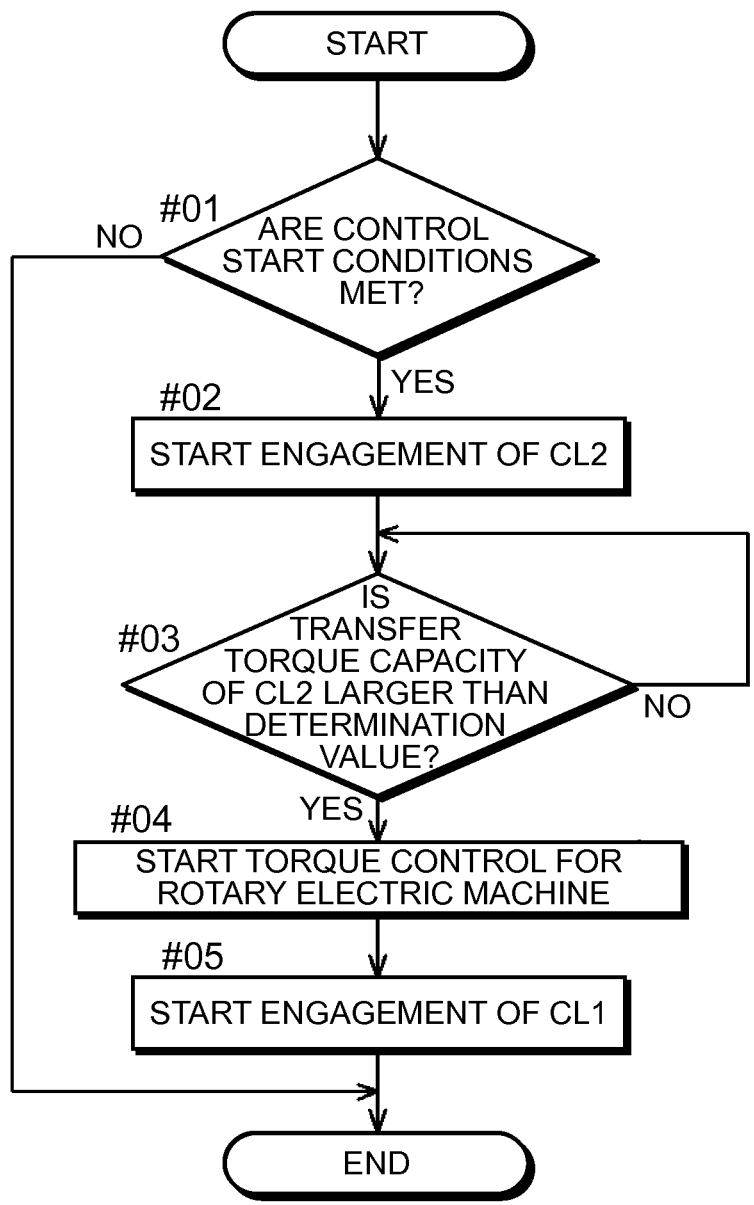
FIG. 3 is a flowchart illustrating a process of a first example and a second example in time-staggered engagement control according to the embodiment of the present invention.

In a first example and a second example to be discussed later, as illustrated in the flowchart of FIG. 3, the time-staggered engagement control section 47 starts a sequence of time-staggered engagement control by determining that the control start conditions are met (step #01: Yes) in the case where a change in shift range from a stop range to a running range is detected with the engine E rotating and with both the first engagement device CL1 and the second engagement device CL2 disengaged. That is, the time-staggered engagement control section 47 starts engagement of the second engagement device CL2 (step #02). Then, the time-staggered engagement control section 47 determines whether the transfer torque capacity of the second engagement device CL2 has become larger than a transfer torque capacity with which the rotary electric machine required torque, which is torque required for the rotary electric machine MG to start the vehicle, can be transferred (step #03). Then, after it is determined that the transfer torque capacity of the second engagement device CL2 has become larger than a transfer torque capacity with which the rotary electric machine required torque can be transferred (step #03: Yes), the time-staggered engagement control section 47 starts torque control in which the rotary electric machine MG is caused to output torque matching the rotary electric machine required torque (step #04), and starts engagement of the first engagement device CL1 (step #05).

The time-staggered engagement control will be described in detail below.

3-4-1-1. Necessity and Principle of Time-staggered Engagement Control

First, the necessity and the principle of the time-staggered engagement control will be described.

<Necessity for Engagement of First Engagement Device CL1 and Second Engagement Device CL2>

In the case where a change in shift range from a stop range to a running range is detected while the engine E is rotating (operating), it is desired to drive the vehicle using the drive force of the engine E in order to improve the fuel efficiency. Specifically, while the engine E is rotating (operating) such as during idling operation, fuel is consumed to rotate the engine E even in the case where the output torque of the engine E is zero. If the amount of supply of fuel is increased from this state, the output torque of the engine E is increased in accordance with the amount of increase of fuel. Hence, it is possible to suppress a complete waste of fuel consumed in the case where the output torque of the engine E is zero by utilizing the engine E as a drive force source, which improves the fuel efficiency. While the engine E is rotating, in addition, the fuel efficiency may be improved by driving the vehicle directly using the output torque of the engine E, rather than by causing the rotary electric machine MG to generate electric power using the output torque of the engine E, charging a battery with the generated electric power, and causing the rotary electric machine MG to perform power running using the electric power charged in the battery to drive the vehicle.

In the case where the shift range is changed from a stop range to a running range, in addition, it is highly likely that the driver depresses the accelerator pedal thereafter, which increases the necessity for transfer of a drive force (torque) matching the increase in accelerator operation amount from a drive force source to the wheels W.

Some vehicles, for example the vehicle according to the embodiment, are configured to perform so-called creep. The term "creep" refers to run in which creep torque, which allows the vehicle to run at a very low speed (creep), is transferred from a drive force source to the wheels W even in the case where the accelerator operation amount is close to zero with the driver not depressing the accelerator pedal in a running range. In such vehicles, it is necessary that creep torque should be transferred from a drive force source to the wheels W even in the case where the accelerator operation amount is close to zero with the accelerator pedal not depressed in the case where the shift range is changed from a stop range to a running range.

Thus, in the case where a change in shift range from a stop range to a running range is detected while the engine E is rotating (operating), the first engagement device CL1 and the second engagement device CL2 are engaged to transfer the drive force of the engine E to the wheels W.

<Issue Involved with Engagement of First Engagement Device CL1 and Second Engagement Device CL2>

If it is attempted to engage the first engagement device CL1 and the second engagement device CL2 at the same time, however, the amount of working oil that needs to be supplied from the hydraulic control device PC to the engagement devices CL1 and CL2 is increased, which may make the amount of supply of working oil from the hydraulic control device PC shorter than the necessary amount. If the amount of supply of working oil is short, the hydraulic pressure supplied to the engagement devices CL1 and CL2 is reduced. Such a reduction in hydraulic pressure lengthens the time taken since the start of engagement until the engagement devices CL1 and CL2 are engaged compared to a case where one of the engagement devices CL1 and CL2 is engaged, and lengthens the time taken since the shift range is changed until the drive forces of the engine E and the rotary electric machine MG are transferred to the wheels W.

In particular, in the case where a stop range is selected with the engine E rotating and with both the first engagement device CL1 and the second engagement device CL2 disengaged, the vehicle drive device 1 excluding the engine E (that is, the rotary electric machine MG, the speed change mechanism TM, the input shaft I, the intermediate shaft M, the output shaft O, and so forth) is normally not rotating. In this state, a hydraulic pressure may not be generated by driving a hydraulic pump using the rotational drive force of the vehicle drive device 1 excluding the engine E.

<Time-staggered Engagement of First Engagement Device CL1 and Second Engagement Device CL2>

Thus, in the present invention, the second engagement device CL2 is engaged first, and thereafter the first engagement device CL1 is engaged.

If the second engagement device CL2 is engaged earlier than the first engagement device CL1 after a change in shift range is detected, the time taken until the second engagement device CL2 is engaged can be reduced compared to a case where the two engagement devices CL1 and CL2 are engaged at the same time. When the second engagement device CL2 is engaged, the drive force of the rotary electric machine MG can be transferred to the wheels W, which makes it possible to start the vehicle using the drive force of the rotary electric machine MG. Hence, in the case where the second engagement device CL2 is engaged earlier, the period before the vehicle can be started using the drive force of the drive force source with the second engagement device CL2 engaged after a change in shift range is detected can be reduced compared to a case where the two engagement devices CL1 and CL2 are engaged at the same time.

In the case where the first engagement device CL1 is engaged earlier than the second engagement device CL2 and thereafter the second engagement device CL2 is engaged, as opposed to the present invention, the rotational speed of the rotary electric machine MG is raised to the rotational speed of the engine E, which is rotating, by the engagement of the first engagement device CL1. Because the output shaft O is not rotating, the difference in rotational speed between the engagement members of the second engagement device CL2 is increased. Because the second engagement device CL2 is engaged thereafter, the second engagement device CL2 is brought into a slipping engagement state for a period before there is no difference in rotational speed between the engagement members of the second engagement device CL2. Here, since the engine E is rotating, the difference in rotational speed between the engagement members is decreased as the vehicle speed is increased. Hence, the period of the slipping engagement state is continued until the difference in rotational speed between the engagement members becomes zero with the vehicle speed increased, which may shorten the life of the second engagement device CL2 because of heat generated by dynamic friction of the friction engagement elements. In the embodiment, the second engagement device CL2 is one of a plurality of engagement devices or a singular engagement device establishing a shift speed in the speed change mechanism TM, and therefore may be inferior in durability to the only, dedicated first engagement device CL1.

Hence, in the present invention, the second engagement device CL2 is engaged earlier to allow the second engagement device CL2 to transition from the disengaged state directly to the direct engagement state, and the second engagement device CL2 can be prevented from entering the slipping engagement state. In the present invention, the engine E is rotating when the first engagement device CL1 is engaged after the second engagement device CL2 is engaged, and therefore the first engagement device CL1 is brought into the slipping engagement state until the vehicle speed is increased. However, the durability of the only, dedicated first engagement device CL1 can be easily improved as described above, and therefore it is possible to suppress shortening of the life of the first engagement device CL1.

3-4-1-2. Behavior in Time-staggered Engagement Control (First Example)

The time-staggered engagement control will be described below with reference to a first example illustrated in the time chart of FIG. 4.

<Satisfaction of Control Start Conditions>

The time-staggered engagement control section 47 starts a sequence of time-staggered engagement control (time t11) by determining that the control start conditions are met in the case where a change in shift range from a stop range to a running range is detected with the engine E rotating and with both the first engagement device CL1 and the second engagement device CL2 disengaged. In the embodiment, the stop range corresponds to the "neutral range N" and the "parking range", and the running range corresponds to the "drive range D" and the "reverse drive range". In the example illustrated in FIG. 4, a change in shift range from the "neutral range N" to the "drive range D" is detected.

Here, the phrase "the engine E is rotating" means that the engine E is operating with the engine output shaft Eo such as the crankshaft of the engine E rotating.

In the initial state before the time-staggered engagement control is started, the engine E is rotating with the first engagement device CL1 in the disengaged state, and the engine E is operating while running idle.

Figure 4:
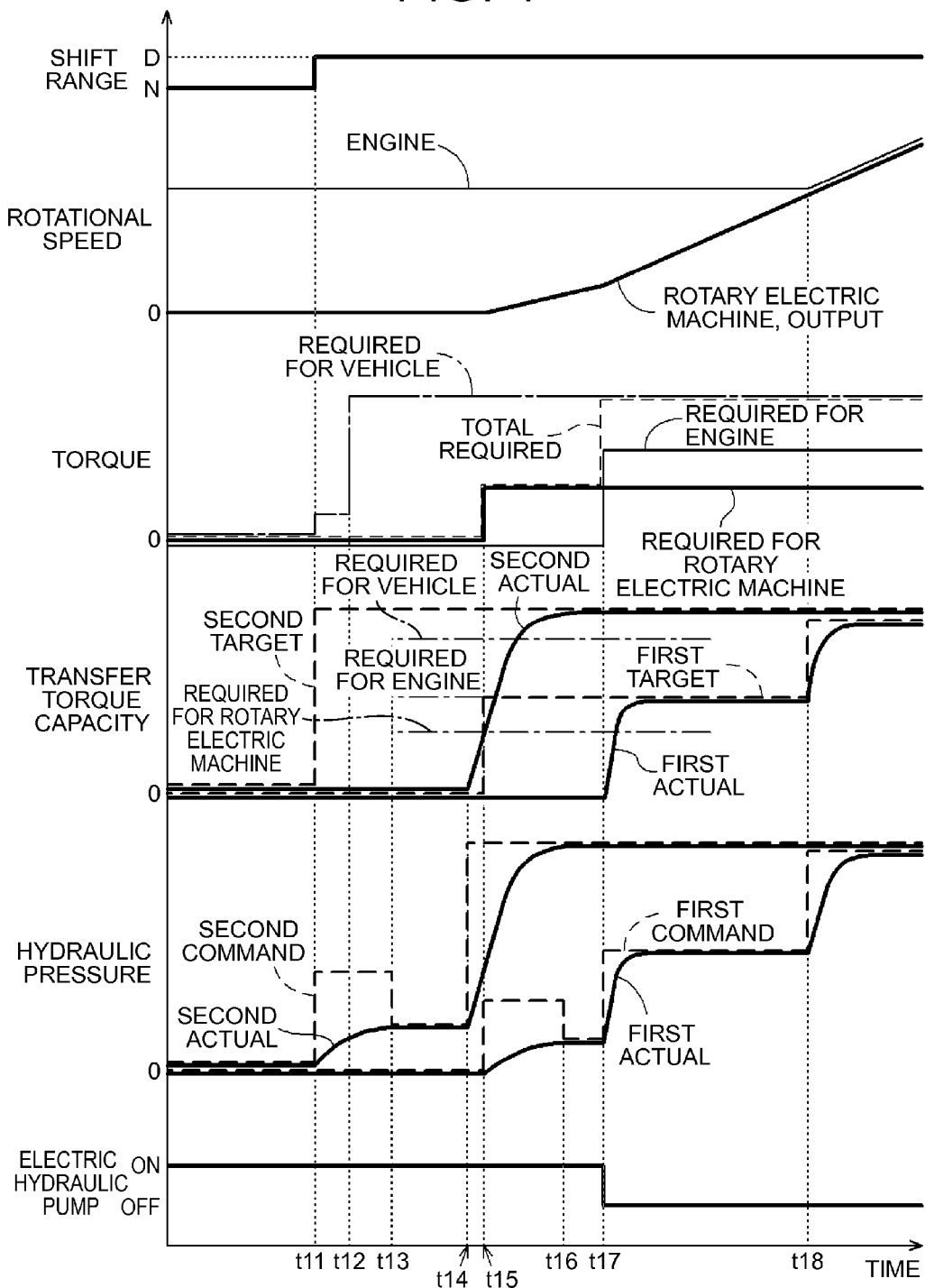
FIG. 4 is a timing chart illustrating the process of the first example in the time-staggered engagement control according to the embodiment of the present invention.

In the example illustrated in FIG. 4, the engine E is controlled to an idling operation state (until time t17). In the idling operation state, fuel is supplied into a combustion chamber of the engine E to be combusted, and the rotational speed of the engine E is controlled to a minimum rotational speed at which the engine E can rotate stably through rotational speed control or the like. In the idling operation state, positive torque produced by the combustion in the engine E and negative torque produced by friction, pumping, and so forth of the engine E are generally balanced with each other, and the time average of the output torque of the engine E is zero.

In the example illustrated in FIG. 4, when a change in shift range from a stop range to a running range is detected (time t11), the control device 30 determines that the accelerator operation amount is small and the accelerator pedal is not depressed. Then, in the case where a change in shift range is detected (time t11), the control device 30 increases the vehicle required torque from zero to the creep torque which allows the vehicle to run at a very low speed.

<Start of Engagement of Second Engagement Device CL2>

In the case where it is determined that the control start conditions are met, the time-staggered engagement control section 47 starts engagement of the second engagement device CL2 (time t11).

In the embodiment, the time-staggered engagement control section 47 is configured to increase the second target torque capacity, which is the target value for the transfer torque capacity of the second engagement device CL2, from zero to a complete engagement capacity in the case where it is determined that the control start conditions are met. The term "complete engagement capacity" refers to a transfer torque capacity with which an engaged state without slipping can be maintained even if torque transferred from the drive force source to the second engagement device CL2 is fluctuated. In the embodiment, the complete torque capacity is set to a value that is larger than the total of the maximum output torque of the engine E and the maximum output torque of the rotary electric machine MG.

The second engagement device control section 45 provides the hydraulic control device PC with a command for a second command pressure set on the basis of the second target torque capacity according to the command provided from the vehicle control unit 34 as described above, and the hydraulic control device PC is configured to supply the second engagement device CL2 with a hydraulic pressure at the second command pressure according to the command. In the embodiment, the second engagement device control section 45 is configured such that the second command pressure is set to around zero in the case where the second target torque capacity is zero. Hence, working oil at a high hydraulic pressure is not supplied to a hydraulic cylinder of the second engagement device CL2. A hydraulic servo mechanism of the engagement devices CL1 and CL2 according to the embodiment includes a hydraulic cylinder, and a piston in the hydraulic cylinder is moved to the disengagement side by the reaction force of a return spring to decrease the volume of a hydraulic chamber in the hydraulic cylinder. Therefore, in order to press the engagement members against each other by moving the piston in the hydraulic cylinder to the engagement side, it is necessary to increase the volume of the hydraulic chamber in the hydraulic cylinder by filling the hydraulic chamber with working oil.

In the embodiment, the second engagement device control section 45 is configured to perform preliminary filling control in which the piston in the hydraulic cylinder of the second engagement device CL2 is moved to the engagement side by injecting the hydraulic chamber in the hydraulic cylinder with working oil in the case where the second target torque capacity is increased from zero. In the preliminary filling control, the second command pressure is basically set to around a stroke end pressure. Here, the term "stroke end pressure" refers to a hydraulic pressure at which the piston in the hydraulic cylinder is moved to the engagement side with the reaction force of the return spring overcome to start pressing the engagement members against each other so that the second engagement device CL2 starts producing a transfer torque capacity.

In the embodiment, the phrase "engagement of the second engagement device CL2 or the first engagement device CL1 to be discussed later is started" refers to starting to move a piston (hydraulic piston) provided in the engagement device CL2 or CL1 to the engagement side.

In the embodiment, the second engagement device control section 45 is configured to set the second command pressure to a predetermined pressure that is higher than the stroke end pressure in order to speed up filling of the hydraulic chamber in the hydraulic cylinder with working oil during a first predetermined period (from time t11 to time t13) after the start of the preliminary filling control. The second engagement device control section 45 is configured to set the second command pressure to around the stroke end pressure during a second predetermined period (from time t13 to time t14) after the lapse of the first predetermined period. With such preliminary filling control performed, the state of the second engagement device CL2 at the time point of the termination of the preliminary filling control may be stabilized around a state in which the second engagement device CL2 starts producing a transfer torque capacity. Hence, the actual pressure within the hydraulic cylinder of the second engagement device CL2 (hereinafter referred to as a "second actual pressure") may be increased responsively with generation of a dead-time delay suppressed in the case where the second command pressure is increased from around the stroke end pressure after the termination of the preliminary filling control. That is, a dead-time delay in delay in response of the second actual pressure to the second command pressure may be managed accurately by performing preliminary hydraulic control. Consequently, it is possible to improve the estimation accuracy of the actual transfer torque capacity (second actual transfer torque capacity) estimated on the basis of a second target transfer torque capacity to be discussed later.

The second engagement device control section 45 is configured to increase the second command pressure from around the stroke end pressure to a hydraulic pressure at which the second target torque capacity is achieved (time t14) after the termination of the preliminary filling control.

In addition, the second engagement device control section 45 is configured to estimate the actual transfer torque capacity (hereinafter referred to as a "second actual transfer torque capacity") on the basis of the second target transfer torque capacity. In the embodiment, the second engagement device control section 45 is configured to calculate the second actual transfer torque capacity by performing a response delay process such as a dead-time delay process and a first-order delay process on the second target transfer torque capacity. Here, the dead time in the dead-time process is set to a period (from time t11 to time t14) from the time point when the second target transfer torque capacity is increased from zero to the time point when the preliminary hydraulic control is terminated and the second command pressure is increased from around the stroke end pressure to a hydraulic pressure corresponding to the second target torque capacity. In the embodiment, the second engagement device control section 45 is configured to set the estimated value of the second actual transfer torque capacity to zero during a period for which the preliminary hydraulic control is executed as the dead-time process. Then, the second engagement device control section 45 calculates the second actual transfer torque capacity by performing a response delay process such as a first-order delay process on the second target transfer torque capacity after the termination of the period of the preliminary hydraulic control.

<Start of Torque Control for Rotary Electric Machine MG and Start of Engagement of First Engagement Device CL1>

In the example illustrated in FIG. 4, after the shift range is changed from a stop range to a running range, the accelerator pedal is depressed by the driver to increase the accelerator operation amount, and the vehicle control unit 34 increases the vehicle required torque from the creep torque (time t12). In addition, the vehicle control unit 34 also increases the rotary electric machine required torque and the engine required torque (not illustrated) in accordance with the increase in vehicle required torque. It should be noted, however, that the vehicle control unit 34 is configured not to transfer the calculated rotary electric machine required torque to the rotary electric machine control unit 32, but to transfer a value of zero as the rotary electric machine required torque to the rotary electric machine control unit 32 until torque control for the rotary electric machine MG to be discussed later is started. In addition, the vehicle control unit 34 is configured not to transfer the calculated engine required torque to the engine control device 31, but to transfer a value of zero as the engine required torque to the engine control device 31 until torque control for the engine E to be discussed later is started. In FIG. 4, the rotary electric machine required torque and the engine required torque to be transferred to the vehicle control unit 34 or the engine control device 31 are indicated.

After the second target transfer torque capacity is increased, the time-staggered engagement control section 47 determines whether or not the transfer torque capacity of the second engagement device CL2 has become larger than a transfer torque capacity with which the rotary electric machine required torque, which is torque required for the rotary electric machine MG to start the vehicle, can be transferred.

In the embodiment, the time-staggered engagement control section 47 is configured to determine whether or not the second actual transfer torque capacity estimated on the basis of the second target transfer torque capacity has become larger than the rotary electric machine required torque calculated by the vehicle control unit 34.

After it is determined that the second actual transfer torque capacity has become larger than the rotary electric machine required torque, the time-staggered engagement control section 47 starts torque control in which the rotary electric machine MG is caused to output torque matching the rotary electric machine required torque, and starts engagement of the first engagement device CL1.

In this way, the rotary electric machine MG is caused to output the rotary electric machine required torque after the second actual transfer torque capacity becomes larger than a transfer torque capacity with which the rotary electric machine required torque can be transferred. Thus, the second engagement device CL2 can be prevented from entering the slipping engagement state, and maintained in the direct engagement state. Hence, it is possible to prevent occurrence of a torque shock when the second engagement device CL2 is brought into the direct engagement state after entering the slipping engagement state, and to prevent a reduction in durability of the second engagement device CL2 due to heat generated while the second engagement device CL2 is in the slipping engagement state.

In addition, the rotary electric machine MG is caused to output torque in the case where the second actual transfer torque capacity reaches a minimum transfer torque capacity with which the second engagement device CL2 can be maintained in the direct engagement state. Thus, it is possible to minimize the period for which the output torque of the rotary electric machine MG is transferred to the wheels W side while maintaining the second engagement device CL2 in the direct engagement state.

Then, the output torque of the rotary electric machine MG transferred to the wheels W side can be used to start the vehicle, and increase the vehicle speed.

In the embodiment, in the case where it is determined that the second actual transfer torque capacity has become larger than the rotary electric machine required torque (time t15), the time-staggered engagement control section 47 starts torque control in which the rotary electric machine required torque other than zero (in the example, larger than zero) calculated by the vehicle control unit 34 is transferred to the rotary electric machine control unit 32 to cause the rotary electric machine control unit 32 to output torque matching the rotary electric machine required torque other than zero.

In the embodiment, in the case where it is determined that the second actual transfer torque capacity has become larger than the rotary electric machine required torque (time t15), in addition, the time-staggered engagement control section 47 starts engagement of the first engagement device CL1 by increasing the first target torque capacity from zero to the engine required torque calculated by the vehicle control unit 34. In the embodiment, the first engagement device control section 44 is configured to perform preliminary filling control (from time t15 to time t17) as with the second engagement device control section 45. That is, the first engagement device control section 44 is configured to set the first command pressure to a predetermined pressure that is higher than the stroke end pressure in order to speed up filling of the hydraulic chamber in the hydraulic cylinder with working oil during a first predetermined period (from time t15 to time t16) after the start of the preliminary filling control. The first engagement device control section 44 is configured to set the first command pressure to around the stroke end pressure during a second predetermined period (from time t16 to time t17) after the lapse of the first predetermined period.

<Increase in Transfer Torque Capacity of First Engagement Device CL1 and Start of Torque Control for Engine E>

The first engagement device control section 44 is configured to increase the first command pressure from around the stroke end pressure to a hydraulic pressure at which the first target torque capacity which is set to the value of the engine required torque is achieved (time t17) after the termination of the preliminary filling control.

At the time point (time t17) when the transfer torque capacity of the first engagement device CL1 is increased from zero with the first command pressure increased from around the stroke end pressure, the rotational speed of the rotary electric machine MG, which is raised along with an increase in vehicle speed, is not raised to the rotational speed of the engine E, and there is a difference in rotational speed between engagement members of the first engagement device CL1. In this state, the transfer torque capacity of the first engagement device CL1 is increased from zero, and thus the first engagement device CL1 is brought from the disengaged state into the slipping engagement state (from time t17 to time t18). Hence, the first engagement device CL1 transfers torque at the transfer torque capacity from the engine E side to the rotary electric machine MG side. Because the transfer torque capacity is controlled so as to have the same magnitude as that of the engine required torque, the first engagement device CL1 transfers torque with the same magnitude as that of the engine required torque from the engine E side to the rotary electric machine MG side.

Here, total required torque which is the total of the engine required torque and the rotary electric machine required torque is set so as to match the vehicle required torque. Hence, the torque transferred from the drive force sources side to the wheels W side is increased from torque with the same magnitude as that of the rotary electric machine required torque to torque with the same magnitude as that of the vehicle required torque (at and after time t17).

In the case where the transfer torque capacity of the first engagement device CL1 starts increasing from zero to the first target torque capacity (time t17), the time-staggered engagement control section 47 starts torque control in which the engine E is caused to output torque matching the engine required torque by increasing the engine required torque to be transferred to the engine control device 31 from zero to the engine required torque calculated by the vehicle control unit 34.

In the embodiment, in the case where the first command pressure is increased from around the stroke end pressure (time t17) after the termination of the preliminary filling control, the engine required torque to be transferred to the engine control device 31 is increased from zero to the engine required torque calculated by the vehicle control unit 34. As with the second engagement device control section 45, the first engagement device control section 44 is configured to estimate the actual transfer torque capacity (first actual transfer torque capacity) on the basis of the first target transfer torque capacity. The first engagement device control section 44 may be configured to increase the engine required torque to be transferred to the engine control device 31 from zero in the case where the first actual transfer torque capacity starts increasing from zero.

In this way, torque with the same magnitude as that of the engine required torque to be transferred from the engine E side to the rotary electric machine MG side by the first engagement device CL1 and the output torque of the engine E are balanced with each other, and therefore fluctuations in rotational speed of the engine E can be suppressed. The difference in rotational speed between the engagement members of the first engagement device CL1 can be decreased to suppress fluctuations in timing to transition to the direct engagement state.

Alternatively, the time-staggered engagement control section 47 may be configured to set the engine required torque to be transferred to the engine control device 31 through rotational speed control in which the rotational speed of the engine E is changed so as to approach a predetermined target rotational speed. Also in this case, fluctuations in rotational speed of the engine E can be suppressed.

Then, in the case where the rotational speed of the rotary electric machine MG is increased to the rotational speed of the engine E and the difference in rotational speed between the engagement members of the first engagement device CL1 is decreased to around zero (time t18), the first engagement device CL1 is caused to transition to the direct engagement state by increasing the first target torque capacity from the engine required torque to the complete engagement capacity, and the sequence of time-staggered engagement control is terminated.

<Control for Electric Hydraulic Pump>

In the embodiment, as described above, the vehicle drive device 1 includes, as the hydraulic pressure sources for the hydraulic control system, the mechanical hydraulic pump MOP driven by rotation of the rotary electric machine MG and the electric hydraulic pump EOP driven by the pump electric motor.

The time-staggered engagement control section 47 is configured to engage at least the second engagement device CL2 using a hydraulic pressure from the electric hydraulic pump EOP by driving the pump electric motor for the electric hydraulic pump EOP at least while rotation of the rotary electric machine MG is stopped.

In the embodiment, the vehicle drive device 1 is configured to drive the electric hydraulic pump EOP by controlling the pump electric motor to a driving state when the rotational speed of the rotary electric machine MG is equal to or less than a threshold (except when the main power of the vehicle is turned off). While the rotary electric machine MG is not rotating and while the rotary electric machine MG is rotating at a low speed, the amount of oil supplied by the mechanical hydraulic pump MOP driven by rotation of the rotary electric machine MG is small. In this case, the electric hydraulic pump EOP can be driven to supply working oil.

3-4-1-3. Behavior in Time-staggered Engagement Control (Second Example)

Next, the time-staggered engagement control will be described below with reference to a second example illustrated in the time chart of FIG. 5.

The second example is different from the first example in that the time-staggered engagement control section 47 is configured to control the second engagement device CL2 such that the second engagement device CL2 is brought into the slipping engagement state when the first engagement device CL1 transitions to the direct engagement state after the start of engagement of the first engagement device CL1.

Figure 5:
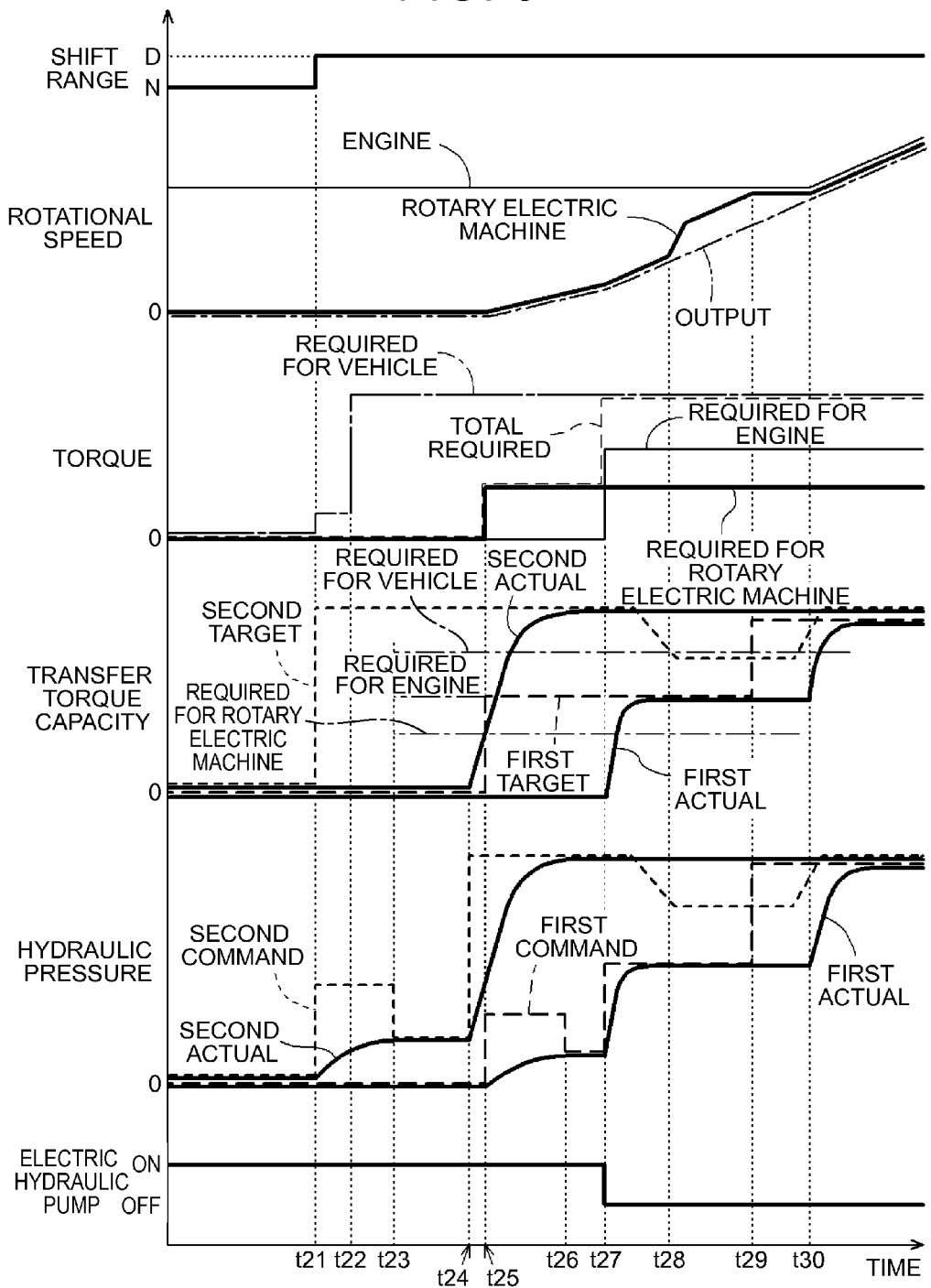
FIG. 5 is a timing chart illustrating the process of the second example in the time-staggered engagement control according to the embodiment of the present invention.

The control performed by the time-staggered engagement control section 47 up to time t27 in the second example illustrated in FIG. 5 is the same as the control performed up to time t17 in the first example illustrated in FIG. 4, and thus the same description will not be repeated.

The time-staggered engagement control section 47 is configured to cause the second engagement device CL2 to transition from the direct engagement state to the slipping engagement state by reducing the second target torque capacity from the complete engagement capacity to a value less than a transfer torque capacity with which the vehicle required torque can be transferred such that the second engagement device CL2 transitions from the direct engagement state to the slipping engagement state after the start of engagement of the first engagement device CL1 (after time t25). When the second target torque capacity becomes less than the transfer torque capacity with which the vehicle required torque can be transferred (at and after time t28), the rotational speed of the rotary electric machine MG starts rising with respect to an output rotational speed. Here, the term "output rotational speed" refers to a rotational speed obtained by multiplying the rotational speed of the output shaft O by the speed ratio of the speed change mechanism TM, and a rotational speed obtained by converting the rotational speed of the output shaft O in terms of the rotational speed of the rotary electric machine MG.

In the case where the rotational speed of the rotary electric machine MG is increased to the rotational speed of the engine E and the difference in rotational speed between the engagement members of the first engagement device CL1 is decreased to around zero (time t29), the first engagement device CL1 is caused to transition to the direct engagement state by increasing the first target torque capacity from a capacity with the same magnitude as that of the engine required torque to the complete engagement capacity.

Then, in the case where the output rotational speed is increased to the rotational speed of the engine E and the rotary electric machine MG and the difference in rotational speed between the engagement members of the second engagement device CL2 is decreased to around zero (around time t30), the second engagement device CL2 is caused to transition to the direct engagement state by increasing the second target torque capacity from a value less than the transfer torque capacity with which the vehicle required torque can be transferred to the complete engagement capacity, and the sequence of time-staggered engagement control is terminated.

In this way, the second engagement device CL2 is controlled to the slipping engagement state when the first engagement device CL1 transitions from the slipping engagement state to the direct engagement state. Thus, it is possible to prevent a torque shock that occurs when the first engagement device CL1 transitions to the direct engagement state from being transferred to the wheels W via the second engagement device CL2.

3-4-1-4. Behavior in Time-staggered Engagement Control (Third Example)

Next, the time-staggered engagement control will be described below with reference to a third example illustrated in the time chart of FIG. 8.

In the third example, the time-staggered engagement control section 47 is configured to start engagement of the first engagement device CL1 after the transfer torque capacity of the second engagement device CL2 starts increasing because of the start of engagement of the second engagement device CL2, and to increase the output torque of the rotary electric machine MG from zero after the transfer torque capacity of the second engagement device CL2 starts increasing.

Figure 8:
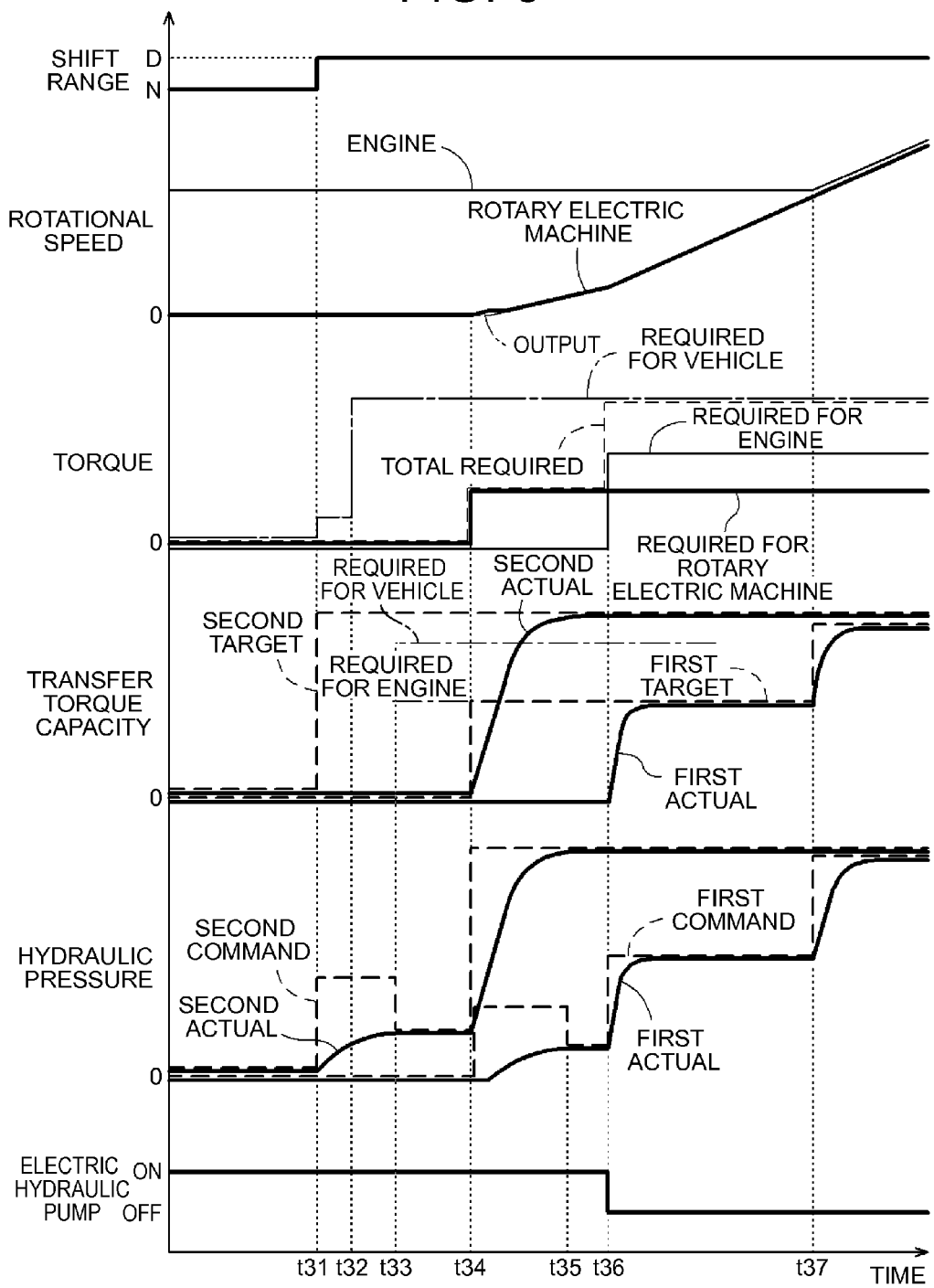
FIG. 8 is a timing chart illustrating a process of a third example in the time-staggered engagement control according to the embodiment of the present invention.

The control performed in the example illustrated in FIG. 8 is the same as the control performed in the example illustrated in FIG. 4 except for the timing to increase the output torque of the rotary electric machine MG and the timing to start engagement of the second engagement device CL2, and thus the same description will not be repeated.

In the example illustrated in FIG. 8, the time-staggered engagement control section 47 is configured to start engagement of the first engagement device CL1 after the second command pressure is increased after the termination of the preliminary filling control. As a result of the preliminary filling control, the piston is moved to the engagement side to start pressing the engagement members against each other so that the second engagement device CL2 starts producing a transfer torque capacity. Therefore, when the second command pressure is increased after the preliminary filling control, the transfer torque capacity of the second engagement device CL2 starts increasing with generation of a dead-time delay suppressed. When this state is established, the amount of supply of working oil that is necessary to move the piston to the engagement side is decreased. Therefore, a shortage of the amount of supply of working oil from the hydraulic pressure supply sources can also be suppressed if engagement of the first engagement device CL1 is started. Hence, the transfer torque capacity of the second engagement device CL2 can also be increased smoothly if engagement of the first engagement device CL1 is started.

In the example illustrated in FIG. 8, the time-staggered engagement control section 47 is configured to start engagement of the first engagement device CL1 in the case where the second command pressure is increased after the termination of the preliminary filling control (time t34). The second engagement device control section 45 increases the second command pressure stepwise from around the stroke end pressure to a hydraulic pressure corresponding to the second target torque capacity (time t34).

In the example illustrated in FIG. 8, in addition, the time-staggered engagement control section 47 is configured to increase the output torque of the rotary electric machine MG from zero after the second command pressure is increased after the termination of the preliminary filling control. As described above, when the second command pressure is increased after the preliminary filling control, the transfer torque capacity of the second engagement device CL2 starts increasing with generation of a dead-time delay suppressed. When the transfer torque capacity of the second engagement device CL2 starts increasing, in addition, the output torque of the rotary electric machine MG can be transferred to the wheels W side. Hence, the output torque of the rotary electric machine MG can be transferred to the wheels W side by increasing the output torque of the rotary electric machine MG after the second command pressure starts increasing after the preliminary filling control. When the transfer torque capacity of the second engagement device CL2 starts increasing, in addition, an increase in rotational speed difference across the second engagement device CL2 can be suppressed even if the output torque of the rotary electric machine MG is increased, which facilitates transition of the second engagement device CL2 to the direct engagement state.

In the example illustrated in FIG. 8, the time-staggered engagement control section 47 is configured to increase the output torque of the rotary electric machine MG from zero in the case where the second command pressure is increased after the termination of the preliminary filling control (time t34). In the example illustrated in FIG. 8, the rotary electric machine required torque to be transferred to the rotary electric machine control unit 32 is increased stepwise from zero (time t34).

After the second command pressure is increased stepwise, the transfer torque capacity of the second engagement device CL2 is increased with a first-order delay with occurrence of a dead-time delay suppressed. On the other hand, the output torque of the rotary electric machine MG is increased with a relatively slight response delay with respect to the increase in rotary electric machine required torque. Therefore, in the example illustrated in FIG. 8, the output torque of the rotary electric machine MG exceeds the torque that can be transferred by the second engagement device CL2 from the rotary electric machine MG side to the wheels W side for a while after the second command pressure is increased, and the rotational speed of the rotary electric machine MG is raised with respect to the output rotational speed. Hence, the second engagement device CL2 is in the slipping engagement state with the difference in rotational speed between the engagement members of the second engagement device CL2 increased. After that, the torque that can be transferred by the second engagement device CL2 exceeds the output torque of the rotary electric machine MG, and therefore the rotational speed of the rotary electric machine MG starts dropping toward the output rotational speed. Then, the second engagement device CL2 transitions to the direct engagement state with the difference in rotational speed between the engagement members of the second engagement device CL2 decreased to zero. The transfer torque capacity of the second engagement device CL2 is rapidly increased after it starts increasing, and therefore elongation of a period for which the second engagement device CL2 is in the slipping engagement state is suppressed.

The time-staggered engagement control section 47 may be configured to gradually increase the output torque of the rotary electric machine MG from zero. In this case, the rate of increase in output torque of the rotary electric machine MG is preferably set to be equal to or less than the rate of increase in transfer torque capacity of the second engagement device CL2. The second engagement device CL2 can be caused to transition to the direct engagement state by preventing the second engagement device CL2 from entering the slipping engagement state by preventing the output torque of the rotary electric machine MG from exceeding the torque that can be transferred by the second engagement device CL2.

The second command pressure may be increased to a command pressure corresponding to the second target torque capacity with the preliminary filling control not performed after the start of engagement of the second engagement device CL2. In this case, the time-staggered engagement control section 47 may be configured to estimate the transfer torque capacity of the second engagement device CL2 by performing a dead-time delay process and a first-order delay filter process on the second target torque capacity. Then, the time-staggered engagement control section 47 may start engagement of the first engagement device CL1 after the estimated transfer torque capacity starts increasing from zero after a dead-time delay, and increase the output torque of the rotary electric machine MG from zero after the estimated transfer torque capacity starts increasing from zero. Alternatively, the time-staggered engagement control section 47 may be configured to start engagement of the first engagement device CL1 after a determination time set in advance so as to correspond to a dead-time delay elapses after the second command pressure is increased, and to increase the output torque of the rotary electric machine MG from zero after the determination time elapses.

3-4-1-5. Behavior in Time-staggered Engagement Control (Fourth Example)

Next, the time-staggered engagement control will be described below with reference to a fourth example illustrated in the time chart of FIG. 9.

In the fourth example, the time-staggered engagement control section 47 is configured to start engagement of the first engagement device CL1 after engagement of the second engagement device CL2 is started, and to increase the output torque of the rotary electric machine MG from zero before engagement of the first engagement device CL1 is started.

Figure 9:
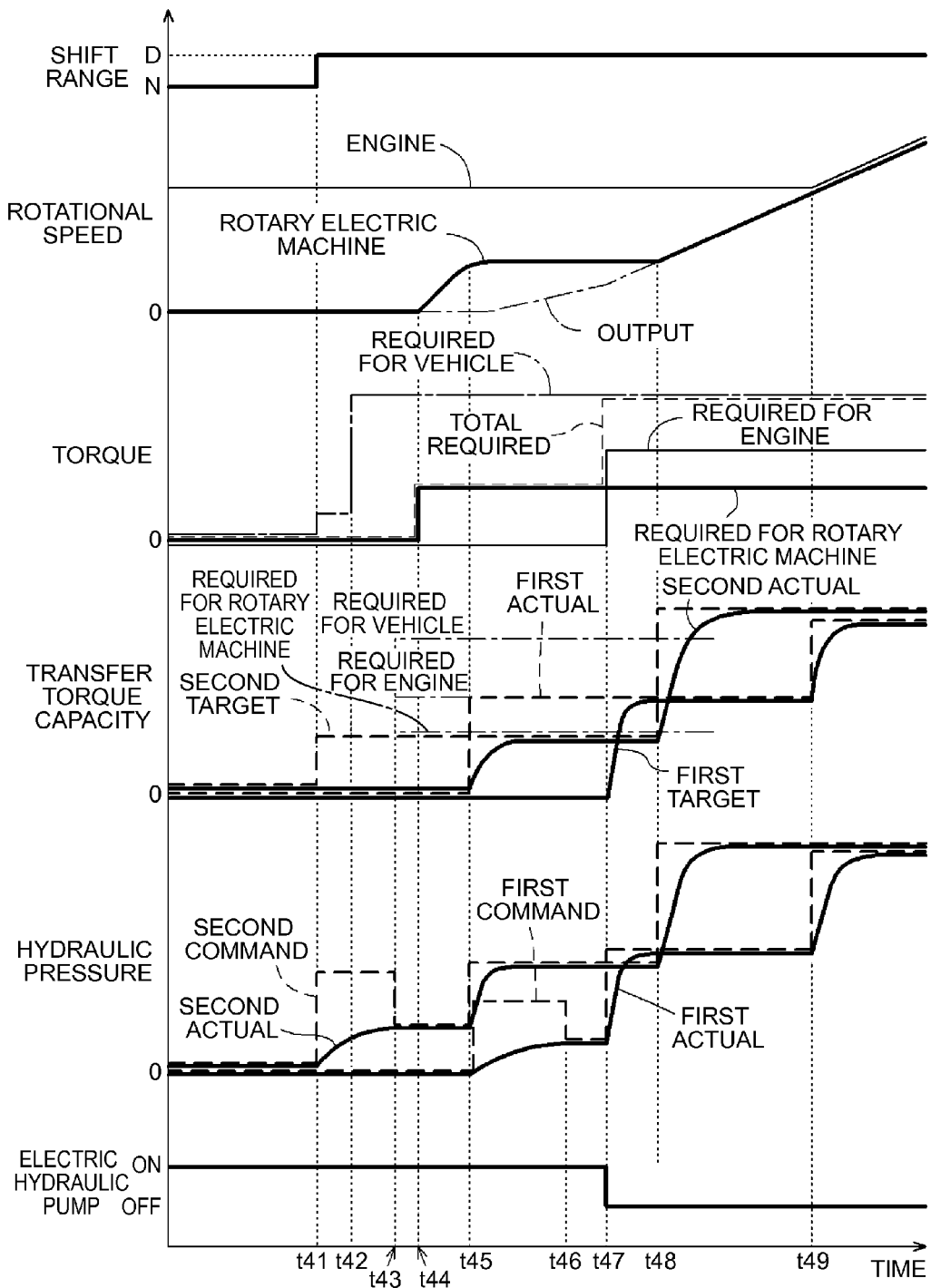
FIG. 9 is a timing chart illustrating a process of a fourth example in the time-staggered engagement control according to the embodiment of the present invention.

The control performed in the example illustrated in FIG. 9 is the same as the control performed in the example illustrated in FIG. 4 except for the timing to increase the output torque of the rotary electric machine MG, the timing to start engagement of the second engagement device CL2, and the pattern of increase in second target torque capacity for the second engagement device CL2, and thus the same description will not be repeated.

In the fourth example illustrated in FIG. 9, unlike the first example, the second example, and the third example, the time-staggered engagement control section 47 is configured to increase the output torque of the rotary electric machine MG from zero before the transfer torque capacity of the second engagement device CL2 starts increasing after engagement of the second engagement device CL2 is started.

In the example illustrated in FIG. 9, the time-staggered engagement control section 47 is configured to increase the output torque of the rotary electric machine MG from zero in the case where a time set in advance elapses after engagement of the second engagement device CL2 is started (time t44). In the example illustrated in FIG. 9, the rotary electric machine required torque to be transferred to the rotary electric machine control unit 32 is increased stepwise from zero (time t44).

The second engagement device CL2 does not transfer torque from the rotary electric machine MG side to the wheels W side before the transfer torque capacity of the second engagement device CL2 starts increasing after an increase in output torque of the rotary electric machine MG, and thus the rotational speed of the rotary electric machine MG is raised with respect to the output rotational speed (from time t44 to time t45). Hence, the second engagement device CL2 is brought into the slipping engagement state after the transfer torque capacity of the second engagement device CL2 is increased. In this state, the second engagement device CL2 transfers torque matching the transfer torque capacity from the rotary electric machine MG side to the wheels W side. In the example illustrated in FIG. 9, in order to transfer torque matching the output torque of the rotary electric machine MG to the wheels W side, the time-staggered engagement control section 47 is configured to increase the second target torque capacity for the second engagement device CL2 to a torque capacity matching the rotary electric machine required torque after engagement of the second engagement device CL2 is started (from time t41 to time t48). Since the rotational speed of the rotary electric machine MG is raised, in addition, the mechanical hydraulic pump MOP can be driven to increase the amount of supply of working oil. Therefore, it is possible to secure supply of working oil for the first engagement device CL1, engagement of which is started after an increase in output torque of the rotary electric machine MG.

When the transfer torque capacity of the second engagement device CL2 starts increasing, a rise in rotational speed of the rotary electric machine MG is suppressed (from time t45 to time t48).

In the case where the difference in rotational speed between the engagement members of the second engagement device CL2 is decreased to around zero with the output rotational speed increased to the rotational speed of the rotary electric machine MG (time t48), the second engagement device CL2 is caused to transition to the direct engagement state by increasing the second target torque capacity from a torque capacity matching the rotary electric machine required torque to the complete engagement capacity. In order to reduce a rise in rotational speed of the rotary electric machine MG, the value of the rotary electric machine required torque may be set to be low until the second engagement device CL2 is caused to transition to the direct engagement state.

In the example illustrated in FIG. 9, as in the third example illustrated in FIG. 8, the time-staggered engagement control section 47 is configured to increase the output torque of the rotary electric machine MG from zero after the transfer torque capacity of the second engagement device CL2 starts increasing (time t34).

Other Embodiments

Lastly, other embodiments of the present invention will be described. The configuration of each embodiment described below is not limited to its independent application, and may be applied in combination with the configuration of other embodiments unless any contradiction occurs.

Figure 6:
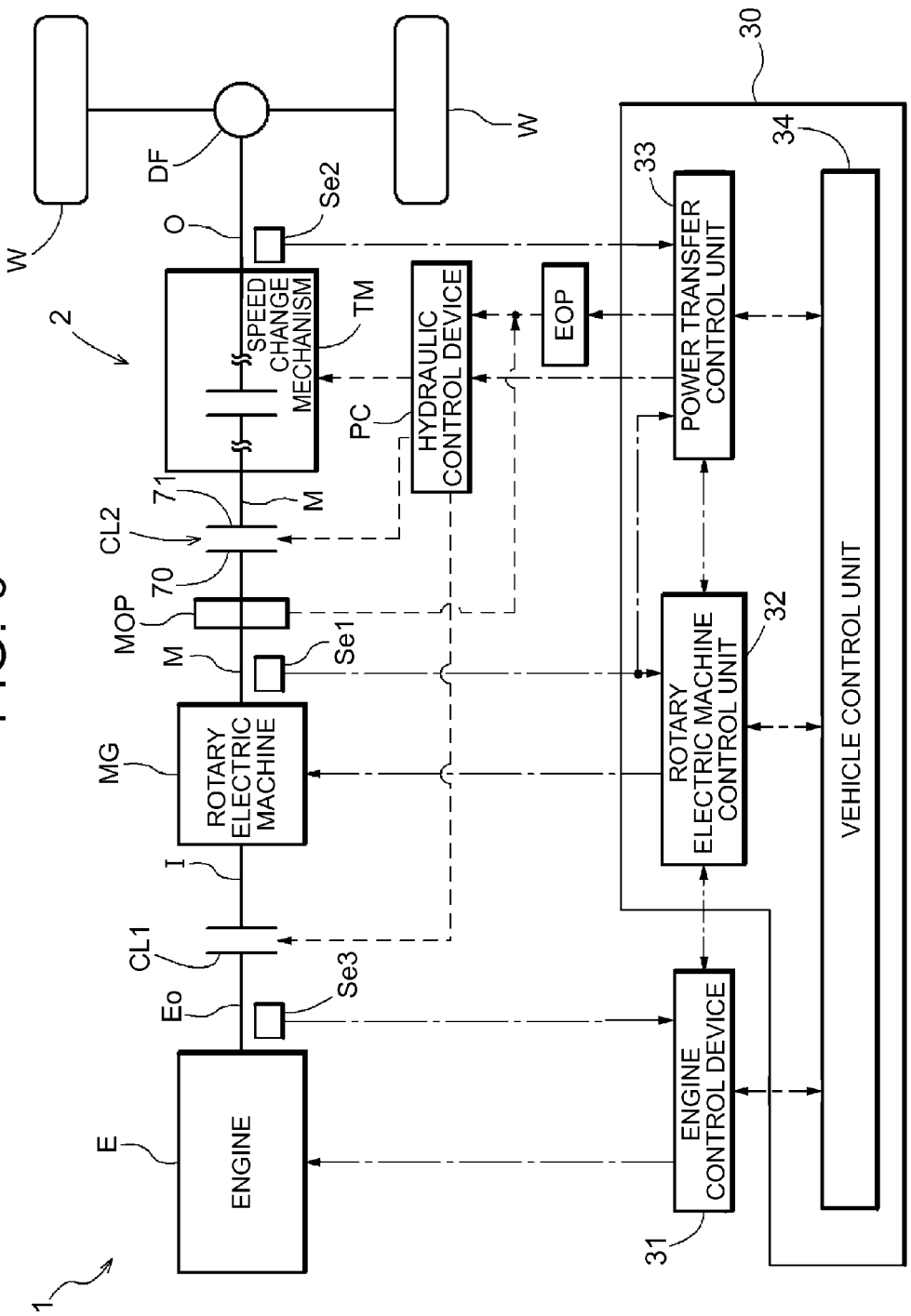
FIG. 6 is a schematic diagram illustrating a schematic configuration of a vehicle drive device and a control device according to another embodiment of the present invention.

(1) In the embodiment described above, one of the plurality of engagement devices of the speed change mechanism TM is set as the second engagement device CL2, the engagement state of which is controlled during the starting control for the engine E. However, embodiments of the present invention are not limited thereto. That is, as illustrated in FIG. 6, the vehicle drive device 1 may further include an engagement device provided in a portion of the power transfer path between the rotary electric machine MG and the speed change mechanism TM, and the engagement device may be set as the second engagement device CL2, the engagement state of which is controlled in the time-staggered engagement control. Alternatively, the vehicle drive device 1 illustrated in FIG. 6 may be configured not to include the speed change mechanism TM.

Figure 7:
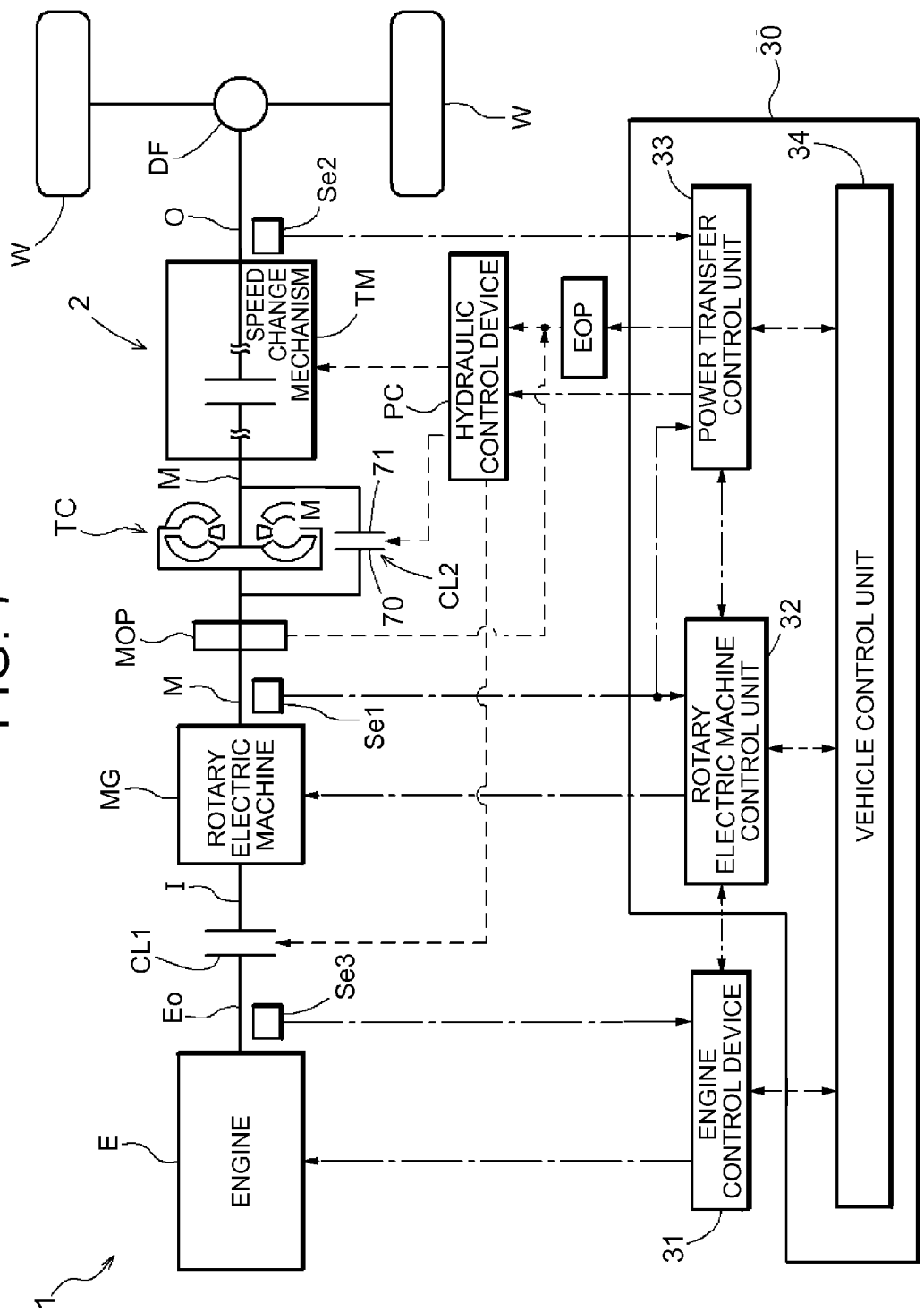
FIG. 7 is a schematic diagram illustrating a schematic configuration of a vehicle drive device and a control device according to still another embodiment of the present invention.

Alternatively, as illustrated in FIG. 7, the vehicle drive device 1 may further include a torque converter TC provided in a portion of the power transfer path between the rotary electric machine MG and the speed change mechanism TM, and a lock-up clutch that brings input and output members of the torque converter TC into a direct engagement state may be set as the second engagement device CL2, the engagement state of which is controlled in the time-staggered engagement control.

(2) In the embodiment described above, the speed change mechanism TM is a stepped automatic transmission. However, embodiments of the present invention are not limited thereto. That is, the speed change mechanism TM may be a transmission other than a stepped automatic transmission, such as a continuously variable automatic transmission capable of continuously changing the speed ratio. Also in this case, an engagement device provided in the speed change mechanism TM may be set as the second engagement device CL2, the engagement state of which is controlled in the time-staggered engagement control, or an engagement device provided separately from the speed change mechanism TM may be set as the second engagement device CL2.

(3) In the embodiment described above, the control device 30 includes the plurality of control units 32 to 34, and the plurality of control units 32 to 34 include the plurality of functional sections 41 to 47 in a distributed manner. However, embodiments of the present invention are not limited thereto. That is, the control device 30 may include the plurality of control units 32 to 34 discussed above as control devices integrated or separated in any combination. Also, the plurality of functional sections 41 to 47 may be distributed in any combination. For example, the rotary electric machine control unit 32 and the vehicle control unit 34 may be integrated into a single unit.

(4) In the embodiment described above, the drive shaft of the mechanical hydraulic pump MOP is coupled so as to rotate together with the rotor shaft of the rotary electric machine MG. However, embodiments of the present invention are not limited thereto. That is, the drive shaft of the mechanical hydraulic pump MOP may be coupled so as to rotate together with the crankshaft of the engine E (for example, the engine output shaft Eo). Alternatively, the drive shaft of the mechanical hydraulic pump MOP may be coupled to the crankshaft of the engine E via a first one-way clutch, and coupled to the rotor shaft of the rotary electric machine MG via a second one-way clutch. The mechanical hydraulic pump MOP may be configured to be driven by one of the engine E and the rotary electric machine MG at a higher rotational speed with the one-way clutch for the one of the engine E and the rotary electric machine MG at a higher rotational speed engaged.

INDUSTRIAL APPLICABILITY

The present invention may be suitably applied to a control device that controls a vehicle drive device in which a rotary electric machine is provided in a power transfer path that connects between an internal combustion engine and wheels and in which a first engagement device is provided between the internal combustion engine and the rotary electric machine and a second engagement device is provided between the rotary electric machine and the wheels.

DESCRIPTION OF THE REFERENCE NUMERALS

1 VEHICLE DRIVE DEVICE
30 CONTROL DEVICE
31 ENGINE CONTROL DEVICE
32 ROTARY ELECTRIC MACHINE CONTROL UNIT
33 POWER TRANSFER CONTROL UNIT
34 VEHICLE CONTROL UNIT
41 ENGINE CONTROL SECTION
42 ROTARY ELECTRIC MACHINE CONTROL SECTION
43 SPEED CHANGE MECHANISM CONTROL SECTION
44 FIRST ENGAGEMENT DEVICE CONTROL SECTION
45 SECOND ENGAGEMENT DEVICE CONTROL SECTION
46 ELECTRIC HYDRAULIC PUMP CONTROL SECTION
47 TIME-STAGGERED ENGAGEMENT CONTROL SECTION
E ENGINE (INTERNAL COMBUSTION ENGINE)
MG ROTARY ELECTRIC MACHINE
TM SPEED CHANGE MECHANISM
CL1 FIRST ENGAGEMENT DEVICE
CL2 SECOND ENGAGEMENT DEVICE
W WHEEL
I INPUT SHAFT
M INTERMEDIATE SHAFT
OUTPUT SHAFT
MOP MECHANICAL HYDRAULIC PUMP (FIRST HYDRAULIC PUMP)

EOP ELECTRIC HYDRAULIC PUMP (SECOND HYDRAULIC PUMP)
D DRIVE RANGE
N NEUTRAL RANGE
PC HYDRAULIC CONTROL DEVICE
Se1 INPUT ROTATIONAL SPEED SENSOR
Se2 OUTPUT ROTATIONAL SPEED SENSOR
Se3 ENGINE ROTATIONAL SPEED SENSOR
Se4 ACCELERATOR OPERATION AMOUNT SENSOR
Se5 SHIFT POSITION SENSOR

The invention claimed is:

1. A control device that controls a vehicle drive device in which a rotary electric machine is provided in a power transfer path that connects between an internal combustion engine and wheels and in which a first engagement device is provided between the internal combustion engine and the rotary electric machine and a second engagement device is provided between the rotary electric machine and the wheels, the control device comprising:
an electronic control unit that includes control logic, which when executed:
immediately starts engagement of the second engagement device when a change in shift range from a stop range to a running range is detected, while an output torque of the rotary electric machine is zero with the internal combustion engine rotating, and both the first engagement device and the second engagement device are disengaged,
starts engagement of the first engagement device after engagement of the second engagement device is started, and
increases the output torque of the rotary electric machine from zero at the same time as engagement of the first engagement device is started or before engagement of the first engagement device is started.

2. The control device for a vehicle drive device according to claim 1, wherein
the electronic control unit starts engagement of the first engagement device after a transfer torque capacity of the second engagement device starts increasing because of the start of engagement of the second engagement device, and the electronic control unit increases the output torque of the rotary electric machine from zero after the transfer torque capacity of the second engagement device starts increasing.

3. The control device for a vehicle drive device according to claim 1, wherein
the electronic control unit starts engagement of the first engagement device and the output torque of the rotary electric machine is increased from zero to cause the rotary electric machine to output torque matching rotary electric machine required torque, which is torque required for the rotary electric machine to start a vehicle, after a transfer torque capacity of the second engagement device becomes larger than a transfer torque capacity with which the rotary electric machine required torque can be transferred because of the start of engagement of the second engagement device.

4. The control device for a vehicle drive device according to claim 1, wherein
a hydraulic pressure supply source for the first engagement device and a hydraulic pressure supply source for the second engagement device are common to each other.

5. The control device for a vehicle drive device according to claim 1, wherein the electronic control unit starts engagement of the first engagement device or the second engagement device by starting to move a hydraulic piston provided in each engagement device to an engagement side.

6. The control device for a vehicle drive device according to claim 1, wherein
the electronic control unit controls the second engagement device such that the second engagement device is brought into a slipping engagement state when the first engagement device transitions to a direct engagement state after engagement of the first engagement device is started.

7. The control device for a vehicle drive device according to claim 1, further comprising:
a first hydraulic pump driven by rotation of the rotary electric machine; and
a second hydraulic pump driven by a pump-driving drive force source that is independent of the rotary electric machine, wherein:
the first hydraulic pump and the second hydraulic pump are hydraulic pressure supply sources that are common to the first engagement device and the second engagement device; and
the electronic control unit drives the pump-driving drive force source to engage at least the second engagement device using a hydraulic pressure from the second hydraulic pump at least while rotation of the rotary electric machine is stopped.

8. A vehicle drive device comprising:
an internal combustion engine;
wheels;
a rotary electric machine provided in a power transfer path that connects between the internal combustion engine and the wheels;
a first engagement device provided between the internal combustion engine and the rotary electric machine;
a second engagement device provided between the rotary electric machine and the wheels; and
an electronic control unit that includes control logic, which when executed:
immediately starts engagement of the second engagement device when a change in shift range from a stop range to a running range is detected, while an output torque of the rotary electric machine is zero with the internal combustion engine rotating, and both the first engagement device and the second engagement device are disengaged,
starts engagement of the first engagement device after engagement of the second engagement device is started, and
increases the output torque of the rotary electric machine from zero at the same time as engagement of the first engagement device is started or before engagement of the first engagement device is started.

9. The vehicle drive device according to claim 8, wherein
the electronic control unit starts engagement of the first engagement device after a transfer torque capacity of the second engagement device starts increasing because of the start of engagement of the second engagement device, and the electronic control unit increases the output torque of the rotary electric machine from zero after the transfer torque capacity of the second engagement device starts increasing.

10. The vehicle drive device according to claim 8, wherein
the electronic control unit starts engagement of the first engagement device and the output torque of the rotary electric machine is increased from zero to cause the rotary electric machine to output torque matching rotary electric machine required torque, which is torque required for the rotary electric machine to start a vehicle, after a transfer torque capacity of the second engagement device becomes larger than a transfer torque capacity with which the rotary electric machine required torque can be transferred because of the start of engagement of the second engagement device.

11. The vehicle drive device according to claim 8, wherein a hydraulic pressure supply source for the first engagement device and a hydraulic pressure supply source for the second engagement device are common to each other.

12. The vehicle drive device according to claim 8, wherein
the electronic control unit starts engagement of the first engagement device or the second engagement device by starting to move a hydraulic piston provided in each engagement device to an engagement side.

13. The vehicle drive device according to claim 8, wherein
the electronic control unit controls the second engagement device such that the second engagement device is brought into a slipping engagement state when the first engagement device transitions to a direct engagement state after engagement of the first engagement device is started.

14. The control device according to claim 8, further comprising:
a first hydraulic pump driven by rotation of the rotary electric machine; and
a second hydraulic pump driven by a pump-driving drive force source that is independent of the rotary electric machine, wherein:
the first hydraulic pump and the second hydraulic pump are hydraulic pressure supply sources that are common to the first engagement device and the second engagement device; and
the electronic control unit drives the pump-driving drive force source to engage at least the second engagement device using a hydraulic pressure from the second hydraulic pump at least while rotation of the rotary electric machine is stopped.

\* \* \* \* \*